United States Patent [19]

Ivanov

[11] Patent Number: 5,706,452
[45] Date of Patent: Jan. 6, 1998

[54] METHOD AND APPARATUS FOR STRUCTURING AND MANAGING THE PARTICIPATORY EVALUATION OF DOCUMENTS BY A PLURALITY OF REVIEWERS

[76] Inventor: Vladimir I. Ivanov, 146 Church St. #3, White Plains, N.Y. 10601

[21] Appl. No.: 568,378

[22] Filed: Dec. 6, 1995

[51] Int. Cl.$^6$ .................................................. G06F 17/60
[52] U.S. Cl. ......................... 395/331; 395/208; 395/334
[58] Field of Search ................................ 395/331, 332, 395/329, 334, 617, 619, 618, 477, 726, 772, 208, 209, 335

[56] References Cited

U.S. PATENT DOCUMENTS

| | | | |
|---|---|---|---|
| 5,008,853 | 4/1991 | Bly et al. | 395/331 |
| 5,132,900 | 7/1992 | Gilchrist et al. | 395/609 |
| 5,208,748 | 5/1993 | Flores et al. | 364/419 |
| 5,216,603 | 6/1993 | Flores et al. | 364/419 |
| 5,283,856 | 2/1994 | Gross et al. | 395/51 |
| 5,312,478 | 5/1994 | Reed et al. | 395/335 |
| 5,319,543 | 6/1994 | Wilhelm | 364/401 |
| 5,337,407 | 8/1994 | Bates et al. | 395/331 |
| 5,388,203 | 2/1995 | Kaneko | 395/335 |
| 5,398,336 | 3/1995 | Tantry et al. | 395/614 |
| 5,434,995 | 7/1995 | Oberlin et al. | 395/550 |
| 5,438,659 | 8/1995 | Notess et al. | 395/334 |
| 5,535,322 | 7/1996 | Hecht | 395/201 |
| 5,537,526 | 7/1996 | Anderson et al. | 395/331 |

OTHER PUBLICATIONS

"Competitive Outlook: Image Management Development", Analysis: Metaview–OmniDesk, DIALOG File 753: Datapro Reports and Analysis, 4 pages, 1996.
"Signma Ships OmniDesk Version 2.21", DIALOG File 621:IAC New Prod.Annou., 2 pages, 1996.
F. Leymann, W. Altenhuber, "Managing Business Processes as an Information Resource," IBM Systems Journal, vol. 33 No. 2, 1994, pp. 326–348.
"Glossary—A Workflow Management Coalition Specification" Available Via http://www.aiai.ed.ac.uk/wfmc/, Jun. 6, 1996.
"Actionworkflow Application Builder for Notes User's Guide," Action Technologies, Inc. pp. 20–21, no date.
Arvind, D.E. Coller, and G.K. Haa, "Assessing the Benefits of Fine–Grain Parallelism in Dataflow Programs," in Proc. 3rd Intl. Conf. Supercomputers, 1988 pp. 60–69.
V.I. Ivanov, "Performance Evaluation of Task Grain Programs," in Proc. 8th Intl. Parallel Proc. Symposium, 1994, pp. 644–648.
"Wit the API Library," Technical Reference Manual, Oct. 1994, Application Partners, Inc. pp. 18–22.

*Primary Examiner*—Donald E. McElheny, Jr.

[57] ABSTRACT

A method for structuring the process of participatory document evaluation by a plurality of reviewers utilizing a feed-forward synchronization schema defined as a workflow graph (52) construct. The workflow graph construct allows one to define efficient document evaluation strategies that take advantage of the inherent parallelism within a business process, and take into account the data dependencies exhibited by the business process. Independent aspects of each document are evaluated in parallel, and a stage evaluation is started when all required data (including data provided by other reviewers) is available. The workflow graph construct assembles together a set of workflow objects (review (46), roles (48), stages (50), document (44)), and associates a set of functional properties to each of them. The topology of the workflow graph describes the synchronization schema, while the functional properties provide additional flexibility and further refine the evaluation strategy. A method for managing the process of participatory document evaluation by a plurality of reviewers utilizing a programmed computer system. Documents to be reviewed are prepared by a set of preparers, and are stored into a database (38). Reviewers participate in the review process by evaluating aspects of the document within their area of expertise. Depending on the information in each individual document, a set of reviewers is notified that the document is ready for their review. Each reviewer is notified at the time appropriate for his/her role via electronic mail by a workflow manager (30).

20 Claims, 15 Drawing Sheets

Workflow Graph Triplet

Source Stage: s1   Role(s):   software platform   Destination Stage: s2

FIG. 7A

Role

| | | | |
|---|---|---|---|
| Name: | competitors | | |
| Max Notifications: | 1 | | |
| Notif Template is: | NAME | Notif Template: | tpltCompetitors |
| Number to Finalize: | ALL | | |
| Condition to Finalize is: | NAME | Condition to Finalize: | condFinalizeDetail |
| Transfer on Finalize is: | ENABLED | Transfer on Finalize: | trsfRoleComments trsfEngageMarketability |
| Condition to Stop is: | DISABLED | Condition to Stop: | |
| Transfer on Stop is: | DISABLED | Transfer on Stop: | |
| Weight: | 1 | Grade Formula: | MAX |
| Post Fin Function is: | DISABLED | Post Fin Function: | |

FIG. 7B

Stage

| | | | |
|---|---|---|---|
| Name: | s2 | | |
| Number to Finalize: | ALL | | |
| Condition to Finalize is: | DISABLED | Condition to Finalize: | |
| Transfer on Finalize is: | DISABLED | Transfer on Finalize: | |
| Condition to Stop is: | FORMULA | Condition to Stop: | s2_grd = 0 |
| Transfer on Stop is: | ENABLED | Transfer on Stop: | trsfInsufDetail |
| Weight: | 1 | Grade Formula: | MAX |
| Post Fin Function is: | DISABLED | Post Fin Function: | |
| CCs: | feasibility_cc | | |

FIG. 7C

Formula

Name:      condFinalizeDetail
Text:       $role$_grd = 1

FIG. 7D

Transfer Action

Name:               trsfRejectJustification
Condition:           FORMULA
                          @True Destination Field:    dcTmp
Action Formula:       FORMULA
                          "----------------" + @Newline +
                          "Reviewer: " + rvReviewer + @Newline +
                          rvJustification + @Newline
Post Assign Formula:   FORMULA
                          FIELD dcJustification := dcJustification + dcTmp;
                          FIELD dcTmp := @Unavailable;
                          @True

FIG. 7E

Notification Template

| Name: | No Action Interval | In Review Interval |
|---|---|---|
| tpltCompetitors | 48 hour(s) | 72 hour(s) |
| | 0 minute(s) | 0 minute(s) |

To:
cc:      PP Adminstrator
From:    @Text(Preparer)
Subject: Project Proposal Review for @Identifier.

Please review the attached Project Proposal (use form *Competitors*).
Summary information is as follows:

| Title | @Text(Title) |
|---|---|
| Sponsor | @Text(Sponsor) |

To review the Project Proposal now, double click here @DocLink(@Identifier).

FIG. 7F

To:      Keith Davis; Ingrid Daniels; Frank Dale
cc:      PP Adminstrator
From:    Gary Adler
Subject: Project Proposal Review for Project Number 1078.

Please review the attached Project Proposal (use form *Competitors*).
Summary information is as follows:

| Title | Internal Bid Evaluation System |
|---|---|
| Sponsor | Pat Hirsch |

To review the Project Proposal now, double click here .

FIG. 7G procedure FinalizeDoc(document, reviews) is
a01   crt_stage_set ← document.crt_stage ♦
a02   dc_grd ← document.dc_grd ♦
a03   doc_has_changed ← FALSE ♦
a04   stop_dc ← FALSE ♦
a05   cc_roles ← ∅ ♦
a06   if ∃ rv_s_cond then
a07         for all review ∈ reviews do
a08               if rv_s_cond(review) then
a09                     if ∃ rv_s_xfer then rv_s_xfer(review) ♦
a10                     stop_dc ← TRUE ♦
a11                     ♦
a12               ♦
a13   ♦
a14   repeat
a15         could_fin_st ← FALSE ♦
a16         nxt_stage_set ← ∅ ♦
a17         for all stage ∈ crt_stage_set do
a18               FinalizeStage(crt_stage_set, stage, could_fin_st, cc_roles;
a18'                     nxt_stages, could_fin_st, cc_roles) ♦
a19               nxt_stage_set ← nxt_stage_set ∪ nxt_stages ♦
a20         ♦
a21         crt_stage_set ← nxt_stage_set ♦
a22   while could_fin_st
a23   ♦
a24   if ∃ dc_s_cond And dc_s_cond(document) then stop_dc ← TRUE ♦
a25   if crt_stage_set = ∅ then stop_dc ← TRUE ♦
a26   if stop_dc then goto upd ♦
a27   IdentifyToNotifs(crt_stage_set) ♦
a28   IdentifyCcNotifs(cc_roles) ♦
a29   for all tplt ∈ templates do SendNotif(tplt) ♦
a30   if doc_has_changed then goto upd ♦
a31   stop ♦

FIG. 9A

```
        upd:
a32     document.crt_stage ← crt_stage_set ♦
a33     if stop_dc then
a34             UpdateStatus("dc", DC_FINALIZED, NULL) ♦
a35             SendInfoNotifs(stop_dc) ♦
a36             if crt_stage_set = ∅ then
a37                     IdentifyCcNotifs(cc_roles) ♦
a38                     for all tplt ∈ templates do SendNotif(tplt) ♦
a39             ♦
a40     ♦
a41     if ∃ dc_post then dc_post() ♦
a42     Update ♦
end
```

FIG. 9A (cont)

procedure FinalizeStage(crt_stage_set, stage, could_fin_st, cc_roles;
                         nxt_stages, could_fin_st, cc_roles) is b01   st_grd ← ∅ ♦
b02   Roles ← stage.to_wait ♦
b03   if Roles = ∅ then goto could_fin_st_YES ♦
b04   FinalizeAllRoles(st_grd, Roles; rl_cnt, rl_f_cnt, st_grd) ♦
b05   if rl_f_cnt = 0 then UpdateStatus(stage, ST_ACTIVATED, NULL) ♦
b06   else UpdateStatus(stage, ST_INCOMPLETE, st_grd) ♦
b07   ♦
b08   if ∃ st_s_cond(stage) And st_s_cond(stage) then
b09         stop_dc ← TRUE ♦
b10         if ∃ st_s_xfer(stage) then
b11               for all review ∈ reviews do
b11'                    if review.role ∈ Roles And review.relevant then
b12                           st_s_xfer(stage, review) ♦
b13               ♦
b14         ♦
b15   ♦
b16   if crt_stage_set ∩ stage.prv_barr ≠ ∅ then goto could_fin_st_NO ♦
b17   if (∃ st_f_cond(stage) And st_f_cond(stage)) Or
b17'       st_n_cond(stage, rl_cnt, rl_f_cnt) then goto could_fin_st_YES ♦
      could_fin_st_NO:
b18   nxt_stages ← cell_copy(stage) ♦
b19   // could_fin_st unchanged
b20   return ♦
      could_fin_st_YES:
b21   TransferOnFinalize(stage, Roles) ♦
b22   if ∃ st_post(stage) then st_post(stage) ♦
b23   dc_grd ← dc_grd(dc_grd, st_grd) ♦
b24   UpdateStatus("dc", DC_INCOMPLETE, dc_grd) ♦
b25   UpdateStatus(stage, ST_FINALIZED, NULL) ♦
b26   for all role ∈ stage.to_send do
b27         Reviewers ← role.list ♦
b28         if Reviewers = ∅ then continue (role) ♦
b29         reset_cnt_for_role(role) ♦
b30   ♦
b31   cc_roles ← cc_roles ∪ list_copy(stage.cc_send) ♦
b32   nxt_stages ← list_copy(stage.nxt_barr) ♦
b33   could_fin_st ← TRUE ♦
end

FIG. 9B

```
procedure TransferOnFinalize(stage, Roles) is
c01     for all role ∈ Roles do
c02         if role.fin then
c03             for all review ∈ reviews do
c04                 if review.sta = 'F' And review.role = role And
c04'                    review.relevant then
c05                     if ∃ rl_f_xfer(role) then rl_f_xfer(role, review) ♦
c06                     if ∃ st_f_xfer(stage) then st_f_xfer(stage, review) ♦
c07                 ♦
c08             ♦
c09             UpdateStatus(role, RL_FINALIZED, NULL) ♦
c10             if ∃ rl_post(role) then rl_post(role) ♦
c11         ♦
c12     ♦
end
```

FIG. 9C

```
procedure FinalizeAllRoles(st_grd, Roles; rl_cnt, rl_f_cnt, st_grd) is
d01     rl_cnt ← rl_f_cnt ← 0 ♦
d02     for all role ∈ Roles do
d03         role.fin ← FALSE ♦
d04         Reviewers ← document.role_list ♦
d05         if Reviewers = ∅ then continue (role) ♦
d06         rl_cnt ← rl_cnt + 1 ♦
d07         FinalizeRole(role, Reviewers; rl_grd, could_fin_rl) ♦
d08         if could_fin_rl then
d09             rl_f_cnt ← rl_f_cnt + 1 ♦
d10             st_grd ← st_grd(st_grd, rl_grd) ♦
d11             role.fin ← TRUE ♦
d12         ♦
d13     ♦
end
```

FIG. 9D

```
procedure FinalizeRole(role, Reviewers; rl_grd, could_fin_rl) is
e01     rl_grd ← ∅ ♦
e02     rv_cnt ← rv_f_cnt ← 0 ♦
e03     could_fin_rl ← FALSE ♦
e04     for all R ∈ Reviewers do
e05             rv_cnt ← rv_cnt + 1 ♦
e06             if finalized_exists(R, role) then
e07                     rv_f_cnt ← rv_f_cnt + 1 ♦
e08                     rl_grd ← rl_grd(rl_grd, rv_grd(R, role)) ♦
e09                     ♦
e10     ♦
e11     if rv_f_cnt > 0 then UpdateStatus(role, RL_INCOMPLETE, rl_grd) ♦
e12     if ∃ rl_s_cond(role) And rl_s_cond(role) then
e13             stop_dc ← TRUE ♦
e14             if ∃ rl_s_xfer(role) then
e15                     for all review ∈ reviews do
e16                             if review.reviewer ∈ Reviewers And review.role = role And
e16'                                review.relevant then
e17                                     rl_s_xfer(role, review) ♦
e18                             ♦
e19                     ♦
e20             ♦
e21     ♦
e22     if (∃ rl_f_cond(role) And rl_f_cond(role)) Or
e22'       rl_n_cond(role, rv_cnt, rv_f_cnt) then
e23             could_fin_rl ← TRUE ♦
e24             UpdateStatus(role, RL_TENTATIVE, rl_grd) ♦
e25     ♦
end
```

FIG. 9E boolean function NotifRecipients(Roles) is
f01    recipients ← FALSE ♦
f02    for all role ∈ Roles do
f03         if role.fin then continue (role) ♦
f04         if ∃ $role$_cnt then recipients ← TRUE ♦ break ♦
f05    ♦
f06    return recipients ♦
end

FIG. 9F procedure IdentifyToNotifs(crt_stage_set) is
g01    for all stage ∈ crt_stage_set do
g02         Roles ← stage.to_wait ♦
g03         if NotifRecipients(Roles) then
g04              for all role ∈ Roles do
g05                   if Not role.fin then
g06                        tplt ← search(eval(role.tplt_frma)) ♦
g07                        Reviewers ← role.list ♦
g08                        if Not tplt Or Not Reviewers then continue (role) ♦
g09                        if ∃ $role$_cnt then
g10                             role_cnt ← $role$_cnt ♦
g11                             if role_cnt < role.lim then
g11'                                 ComputeToReviewers(Reviewers, role,
g11"                                                                 role_cnt, tplt) ♦
g12                        ♦
g13                   ♦
g14              ♦
g15         ♦
g16    ♦
end

FIG. 9G procedure ComputeToReviewers(Reviewers, role, role_cnt, tplt) is
h01    new_dat ← FALSE ♦
h02    for all R ∈ Reviewers do
h03        if Not finalized_exists(R, role) then
h04            if role_cnt = 0 then
h05                if in_review_exists(R, role) then
h05'                  new_dat ← TRUE ♦ continue (R) ♦
h05"              ♦
h06            else
h07                if \$role\$_dat+tplt.d_na ≥ now then continue (R) ♦
h08                if in_review_exists(R, role) then
h08'                  if \$role\$_dat+tplt.d_ir ≥ now then continue (R) ♦
h09            ♦
h10            tplt.c_to ← tplt.c_to ∪ R ♦
h11            new_dat ← TRUE ♦
h12        ♦
h13    ♦
h14    if new_dat then
h15        UpdateStatus(role, RL_NOTIFIED, NULL) ♦
h16        doc_has_changed ← TRUE ♦
h17    ♦
end

FIG. 9H procedure IdentifyCcNotifs(cc_roles) is
i01    for all role ∈ cc_roles do
i02        tplt ← search(eval(role.tplt_frma)) ♦
i03        Reviewers ← role.list ♦
i04        if Not tplt Or Not Reviewers then continue (role) ♦
i05        UpdateStatus(role, RL_CARBONCOPIED, NULL) ♦
i06        tplt.cc ← tplt.cc ∪ Reviewers ♦
i07        doc_has_changed ← TRUE ♦
i08    ♦
end

FIG. 9I 5,706,452

METHOD AND APPARATUS FOR STRUCTURING AND MANAGING THE PARTICIPATORY EVALUATION OF DOCUMENTS BY A PLURALITY OF REVIEWERS

1. FIELD OF THE INVENTION

This invention relates generally to computerized methods of doing business, and in particular to methods for defining and managing the process of document review by a plurality of individuals who assess and express their opinions about portions of a document, and/or contribute new information to the document.

2. BACKGROUND

In one sense, aspects of this invention relate to such fields as database management, electronic mail, communication management, and synchronization of parallel processes. In another, more important sense, this invention provides solutions for a newly identified class of problems by integrating state of the art computer and communication tools within a new methodological framework. The general characteristics of a problem in this class are,

- a preparer collects information within a discourse domain and assembles it into a document,
- the document is reviewed by a set of reviewers who rank it collectively; each reviewer evaluates specific aspects of the document, eventually renders a grade which contributes to the overall rank, and possibly adds new information to the document,
- the document is reviewed in stages; a stage acts like a synchronization barrier for the review of certain aspects of the document,
- the system manages the evaluation process by monitoring the status of each document and notifying reviewers of the proper time to review particular aspects.

2.1. DESCRIPTION OF THE PRIOR ART

2.1.1. Databases

Database systems have been used traditionally to organize and store data for efficient retrieval. A database management system defines the structures used to store data, and the operations for assembling disparate data. A database system can thus be used to store documents in different stages of completion, reviews in different stages of preparation, and relate the documents and the associated reviews when needed.

In addition, a database management system allows a certain degree of concurrent access to data, and can hide sensitive information based on user identity. For example, two reviewers residing at different locations can examine a document at the same time and can work on their reviews independently. Also, a user can be denied access to a document if she is not a reviewer or is not explicitly granted this privilege.

Database systems lack the functionality to play an active role in managing the evaluation of documents. Within the strict framework of database systems, reviewers can not be notified that documents are ready for their review but have to constantly monitor the system for "work to do." In addition, the database system alone can not enforce a predefined review sequence; instead, the review discipline must be voluntarily observed by each reviewer.

2.1.2. Electronic Mail

Like the traditional communication systems (regular mail, phone, radio, etc.) electronic mail systems have been used to transfer unstructured information between participants in conversations residing at different locations. Unlike the traditional systems, electronic mail can be used to transfer structured data as well, data which is readily available for other computational purposes.

Each electronic mail user communicates via a computer, has an electronic identity, and an electronic mail box where the incoming messages are delivered. The underlying assumption in electronic mail is that the user monitors the personal mail box for new messages periodically. In the current prevalent practice in electronic mail, the structures relevant for our purpose consist of the sender and receiver(s) identities, along with an unstructured text body which stores the message itself. The user of such a system is provided with general choices of action. For example, the "Send" action allows one to send a message to one or more recipients, "Reply" allows a response to be sent to the original sender, and "Forward" sends a copy of the message along with receiver's comments to a third party.

Electronic mail systems do not provide assistance in structuring the flow of communication toward accomplishment of collective goals and results. The management of the communication is essentially left to the discretion and ability of the users of the system.

Documents to be evaluated can be sent to reviewers via electronic mail, but the preparer has to explicitly know and specify the first reviewer(s), and reviewers have to know and specify the next reviewer(s) as well. In many cases this is unacceptable, in part because the evaluation strategy is decided at a different level, and because rules change without reviewers necessarily being aware of it. U.S. Pat. No. 5,283,856 to Gross et al. (1994) discloses an event-driven rule-based mail messaging system in which a set of rules can be defined to automatically specify the next reviewer(s). The rules are stored in each person's private rule repository, which makes it difficult to maintain all repositories consistent when rules change. Furthermore, since rules take into account the contents of one message only, events associated to a multitude of messages (and requiring synchronization) are difficult (if not impossible) to handle.

2.1.3. Conversation Management Systems

The existence of "forms" in the standard business sense derives from the existence of certain recurring communications in which the collection and transmission of relevant details has the same structure each time. In addition to standardized forms, there can also be standardized "procedures" in which a sequence of actions follows a regular pattern.

Throughout this presentation a business process is a collection of steps, not necessarily performed in sequence, that accomplish a specific business goal. Examples of business processes are the evaluation of competing bids or the approval of purchase requisitions. Processes remove elements of randomness from work, making it more efficient and predictable.

Paper based forms and their associated routing procedures which implement particular business processes are still being used in offices today. Computer technology makes it possible to automate forms generation, processing, and routing by embedding them as programs in data processing systems. For example, U.S. Pat. No. 5,319,543 to Wilhelm (1994) discusses a particular parameterized work procedure for automatic assignment of work to resources in a hospital.

A person using such a system acts within the strict framework of the system and the limited options presented in accordance with the procedures embodied in the computer system.

Acknowledging the fact that systems like those described in the Wilhelm patent implement limited communication protocols, U.S. Pat. Nos. 5,208,748 and 5,216,603, both to Flores et al (1993) present a general method for managing conversations between individuals within a community of participants on the basis of a methodology which is structured and adaptable to different types and categories of conversations.

While in the Flores patents parallelism is handled at the communication level ("a plurality of conversations"), the synchronization of conversations due to data dependencies in the business process is not handled. Similarly, while the Wilhelm patent suggests the parallel routing of cases to a multitude of work queues, it does not address the issue of synchronization once a case exits the queues.

Action Workflow®, a product from Action Technologies, Inc. of Alameda, Calif., is another embodiment of the Flores patents. While providing solutions to the problem of parallel work and synchronization, Action Workflow is still limited in the kinds of parallelism and synchronization allowed (for example, "all child workflows triggered in parallel must return to the same point in their parent work flow," Action Workflow Application Builder for Notes User's Guide, pp. 20–21, Action Technologies, Inc.).

2.1.4. Synchronization of Tasks in Parallel Processing

When dealing with complex documents that have to be evaluated by a multitude of reviewers, a sequential evaluation might result in unacceptable performance. Further, not only that each review becomes a critical step in the process, but each delay increases the overall document evaluation time.

Parallel evaluation is a possible solution to the performance problem. Complications arise when there are data dependencies in the evaluation process. For example, if reviewer A produces result a, reviewer B produces result b, and reviewer C cannot review unless results a and b are available, then C cannot review in parallel with A and B. C's review must be synchronized with A and B's results.

Solutions for similar problems in parallel processing have been suggested both in hardware and in software. For example, U.S. Pat. No. 5,434,995 to Oberlin et al (1995) discloses a barrier mechanism used to synchronize processing elements in a massively parallel processing system.

The evaluation speed of a document ultimately depends on how quickly each reviewer completes his/her evaluation. However, delays in non critical reviews can be masked by the exposed parallelism and could affect the overall evaluation speed little or at all (see Arvind, D. E. Culler, and G. K. Maa, "Assessing the Benefits of Fine-grain Parallelism in Dataflow Programs," in Proc. 3rd Intl. Conf. Supercomputing, 1988, pp. 60–69; V. I. Ivanov, "Performance Evaluation of Task Grain Programs," in Proc. 8th Intl. Parallel Proc. Symp., pp. 644–648, 1994).

2.2. Related Work

The Investment Proposal (IP) system developed by the author in 1995, and not believed to be prior art to the present invention, is an approval/rejection system used to manage expenses within an organization by requiring an approval for each major project.

Preparers compose investment proposal documents which are then reviewed by a set of reviewers depending on specific information in each document. The IP system implements roughly a three tier hierarchical approval/rejection business process. First, each document is reviewed in parallel from a detailed perspective by experts in each category with non zero expenses. Second, final reviewers for each of the technology and real estate areas review a document when all the associated detail reviews are available. Finally, the chief administrative officer reviews a document after all the detail and final reviewers have approved.

Reviewers can either approve or reject a proposal; all reviewers (within an equivalence class) must approve in order for the document to be approved, and a single rejection from any reviewer suffices to reject the document.

Documents and their associated reviews are stored into a database which is permanently monitored by a workflow manager. Reviewers are notified by the workflow manager that a document is ready for their review via electronic mail, and they can review a document in parallel. A rigid OR/AND synchronization schema is hard coded into the system. Although roles and barriers can be added, eliminated, or moved around, the methodology suggested by the IP system lacks flexibility as exemplified below.

The IP system is a particular approval/rejection system. It does not allow reviewers to grade documents or to express a degree of confidence in their grading. Such feature is important in systems that rank documents for comparative purposes, like bid evaluation, paper review, project proposal, etc. It also does not allow reviewers to contribute any information to the reviewed document, which is important in cases when earlier reviewers conduct research and publish the results for the use of later reviewers.

The IP system does allow equivalent reviews. For example, if there are five reviewers for a role, any one review is sufficient for the role to be considered reviewed. Quorums (voting systems) are not supported; such feature is useful, for example, when a project proposal system has to handle exceptions (unavailable reviewers); and to eliminate the bias introduced by a single person's opinion. A critical role could require, for example, that at least three of the five reviewers grade a specific aspect of a proposal.

The IP system statically computes the reviewer lists for each document when the document is submitted. It does not allow earlier reviewers to dynamically change (add, modify, remove) next reviewers neither directly nor indirectly through their actions. Such feature is needed, for example, when a reviewer encounters a controversial aspect in a document and wants to involve a higher ranking person in the decision process, person who otherwise would not be involved.

The IP system allows a fixed number of templates to be used for notifications. It also provides limited substitution of tokens in notifications with actual values from the document. It does not allow the notifications to be customized depending on recipients or other characteristics of the document. Such feature is important in order to provide coaching to reviewers and pinpoint the exact elements that they need to review.

The IP system allows only a uniform OR/AND synchronization schema which can be used in collaborative review systems. Competitive review systems based on an AND/OR schema, fuzzy, quorum based, or hybrid systems cannot be implemented with the methodology suggested by the IP system.

The only exception that the IP system handles is a reviewer's rejection. More complex criteria, such as bad reviews by a "majority" of reviewers in a specific role (voting systems) cannot be implemented within the system or with the methodology suggested by the system.

The IP system implements a limited collective approval/rejection schema and does not suggest a general method for managing a general document evaluation process, which is structured and adaptable to different types and categories of business processes.

3. OBJECTS AND ADVANTAGES

It is the principal object of this invention to provide a flexible methodology for defining efficient strategies for collective document evaluation.

It is another object of this invention to provide a computerized system for managing the process of document evaluation for strategies defined using the aforementioned methodology.

Some of the features of a workflow application built according to the present invention are:

(a) provides different access (security) levels based on user's electronic identity, to protect sensitive information from unauthorized users, (b) allows concurrent access to shared data from a multitude of locations, (c) maintains a history of actions related to each document; this includes, who did what and when, and what was the impact of each action, (d) participants in the evaluation process, including the document author, are notified of events related to the document via electronic mail messages; the personal mail box is the single place that a user has to check regularly, regardless of how many evaluation applications require his/her reviews, (e) the system manages the review process based on the logic specified in the application; participants do not have to know or select who has to review a document next; the routing logic is stored in a central place where it can be maintained consistent for all the people involved in the evaluation process, (f) by performing independent reviews in parallel, the efficiency of the review process is increased; furthermore, the impact on performance of delayed rendering of non critical reviews could be minimized, (g) allows the definition of a feed-forward review schema, to take advantage of the intrinsic parallelism of the business process while observing all its data dependencies.

More specifically, features and advantages unique to this invention include:

(a) each reviewer is specialized in some aspects, and evaluates the corresponding portions, of a document; the result of the evaluation is an inherently subjective grade or level of confidence; grades from individual reviewers for aspects of the document are combined to yield a more objective grade for the entire document, (b) the method of this invention allows a designer to specify how to handle multiple reviews from one reviewer evaluating one aspect of a document; it also allows flexible handling of reviews from different reviewers evaluating one aspect of a document (different reviewers can have different confidence levels); finally, some aspects of the document could weigh more than others (for example, marketability could weigh twice as staff availability), (c) the method allows the grouping of reviewers in roles or equivalency classes; reviews could be required from one, a quorum, or all members of a role, (d) reviewers can contribute new information to a document; this can be used by the preparer as feedback, or by subsequent reviewers as argumentation of predecessor's position, (e) reviewers can also modify the review process itself by specifying which additional aspects need to be reviewed on a case by case basis, (f) the methodology allows a designer to specify an escalation schema (how to handle cases when reviewers do not review a document within the allowed time frame), (g) the method of this invention makes use of a programming language to express complex logic and manipulate data in the document; part of the method flexibility stems from the use of the programming language, (h) modifications in the review authorizations between the moment the document is submitted and the moment reviews are requested can be reflected in the review process; in this respect, the reviewer list can be computed using the programming language just before notifications are sent out, (i) exceptionally, the review process can be stopped if conditions specified in the programming language are satisfied; or the normal review flow based on quorum logic can be altered when other conditions are satisfied, (j) actual notifications sent to inform users of events related to a document are based on notification templates; the notification template to be used is identified for each role by evaluating a programming language expression; the text of the notification is further customized substituting programming language expressions in the template with the result of their evaluation.

Further objects, features, and advantages will become apparent from the following detailed description of the method of this invention, the current embodiment of a system which incorporates the method of this invention, and the sample applications built using this system.

4. BRIEF DESCRIPTION OF THE DRAWINGS

Figure 4:
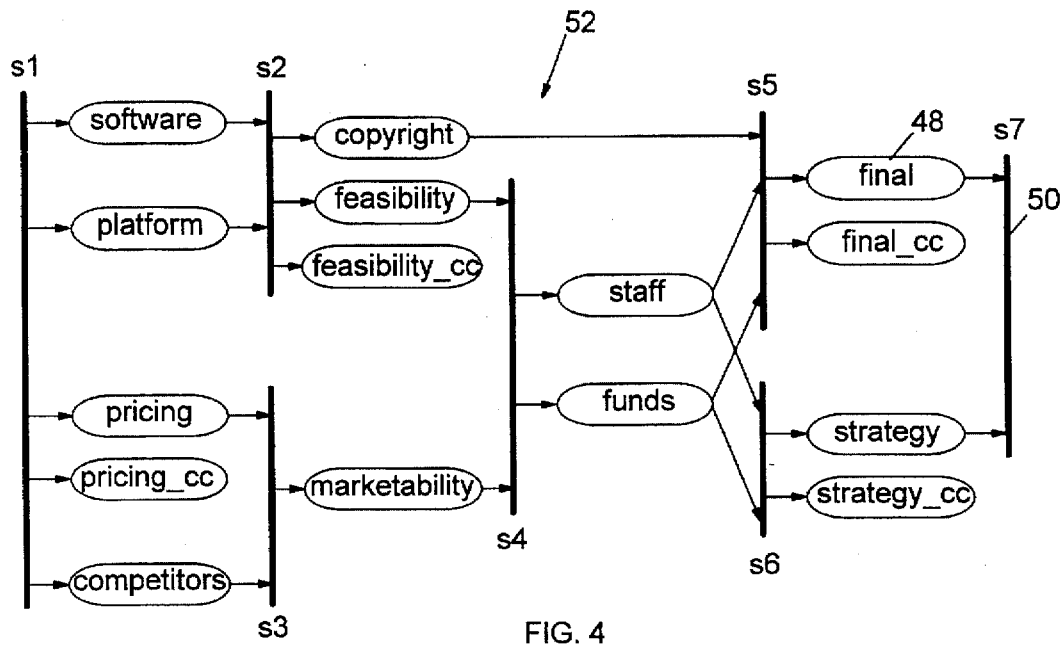

FIG. 4 presents a sample workflow graph for a particular application implemented using the method of this invention.

FIGS. 5A–5D present the four basic configurations used to assemble a workflow graph.

FIGS. 6A–6D illustrate the essential data components and functional properties of workflow objects used in the general method of this invention.

FIGS. 7A–7F illustrate the external representation of the basic constructs used to define a workflow graph in the current embodiment of the method of this invention.

FIG. 7G presents an actual notification obtained from the template in FIG. 7F, and received by a reviewer in an application developed using the current embodiment of the method of this invention.

Figure 8:
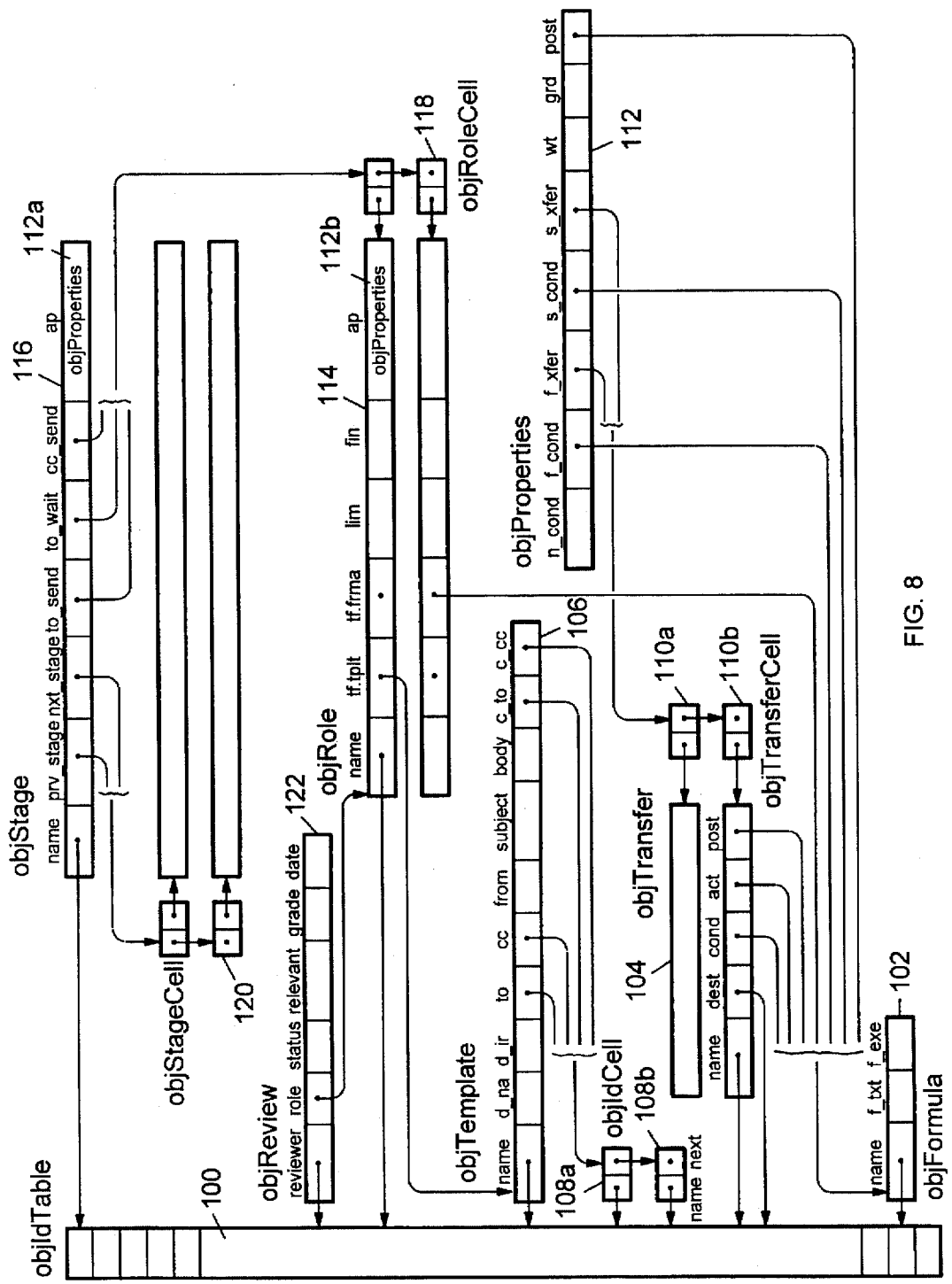

FIG. 8 presents the data structures used internally by the current embodiment of the workflow manager.

FIGS. 9A–9I present the pseudo code implementing the current embodiment of the work flow manager.

Figure 10A:
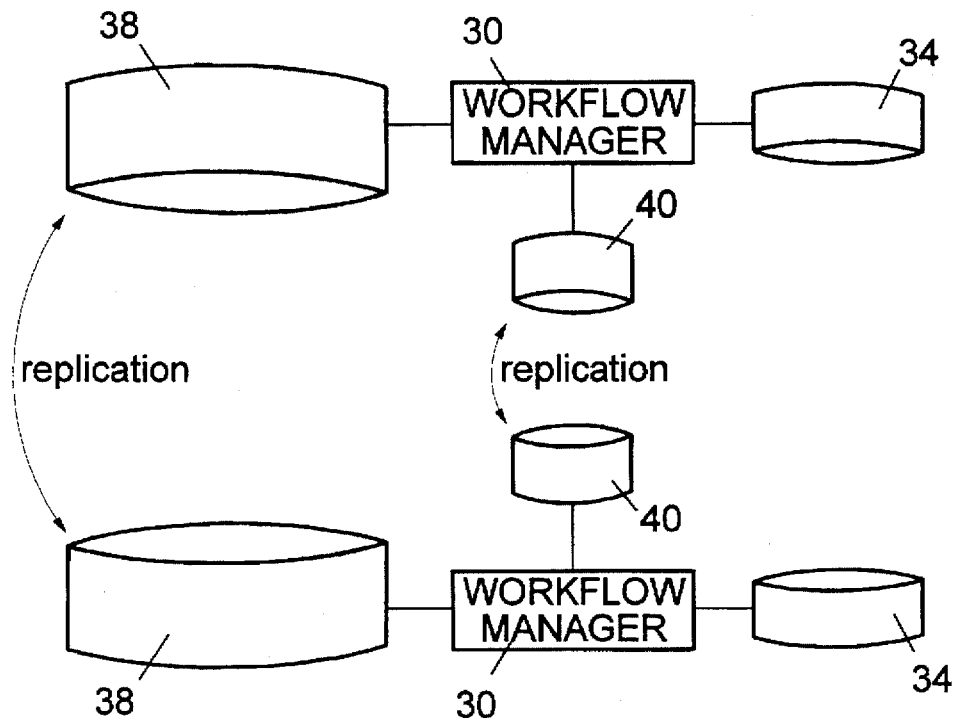
Figure 10B:
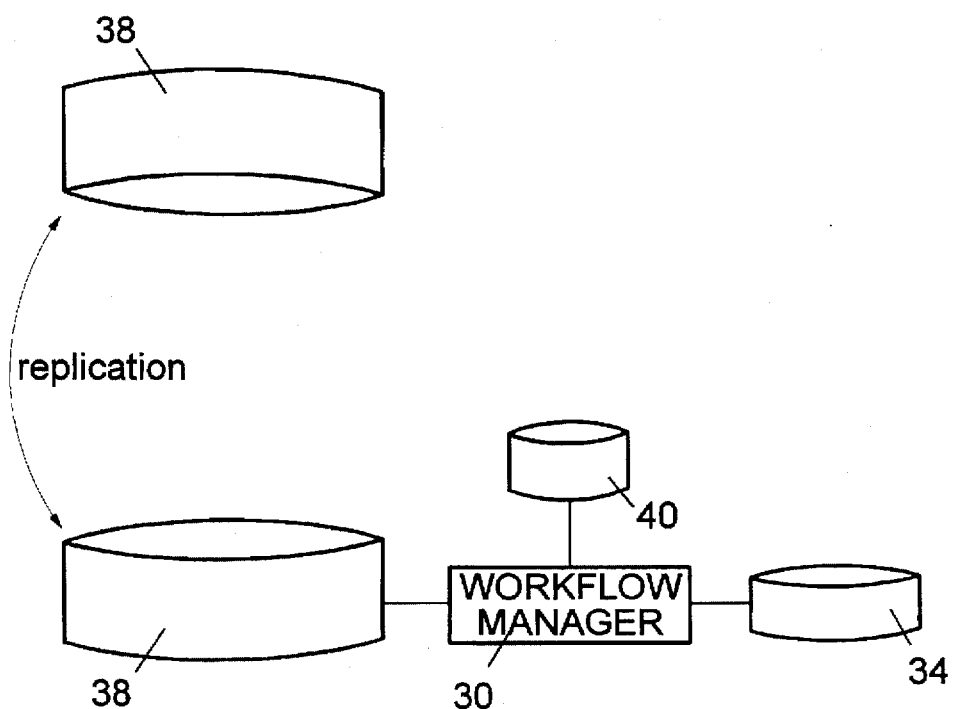

FIGS. 10A and 10B are schematic diagrams of alternative system architectures which may be employed in implementing the method of this invention.

5. DETAILED DESCRIPTION

This invention comprises a method for managing the process of participatory document evaluation by a plurality of reviewers utilizing a programmed computer system. The method of this invention comprises a powerful tool which can be configured in a variety of ways and with different degrees of complexity to achieve productivity increases for a wide class of business processes.

The current embodiment of the method of this invention, the Rank Workflow system, integrates existing database and electronic mail technologies with a unique workflow manager. The database and electronic mail layers in this embodiment are provided by Lotus Notes®, a product from Lotus Development Corporation of Cambridge, Mass. The workflow manager is produced by the author specifically for this platform, and thus the resulting system benefits from the capabilities, and is restricted by the limitations, in Lotus Notes. Those skilled in the art will understand that the particular implementation is only an illustration of the method of this invention, and that the same features can be implemented for other platforms and in a variety of ways.

5.1. Overview

Figure 1:
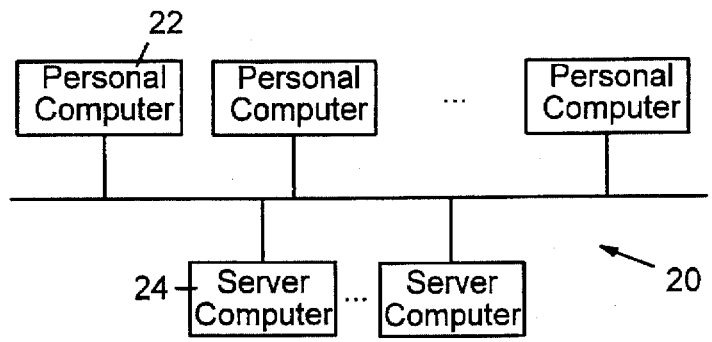
FIG. 1 illustrates the structure of a networked computer system.

FIG. 1 is a high level representation of a networked computer system 20, in particular, a Lotus Notes system. Such system connects a number of personal computers 22 and a number of server computers 24, allowing them to communicate. A user seated in front of personal computer 22 can create, access, modify, and delete data which is shared with other users and resides on server computer 24. Each user has an electronic identity and can communicate with other users via an electronic mail system.

Users of a system implementing the method of this invention can be categorized by the type of actions they take into designers, preparers, and reviewers. An application designer, or designer, builds an application by implementing the method of this invention for a particular business process, for example, a project proposal approval/rejection process, or a bid evaluation process. A preparer gathers together the information that is subject to the review process, for example, the specification of a project proposal, or the details of a bid. Finally, a reviewer participates in the evaluation process by reviewing parts of the document, and eventually, influences the evaluation process itself.

Figure 2:
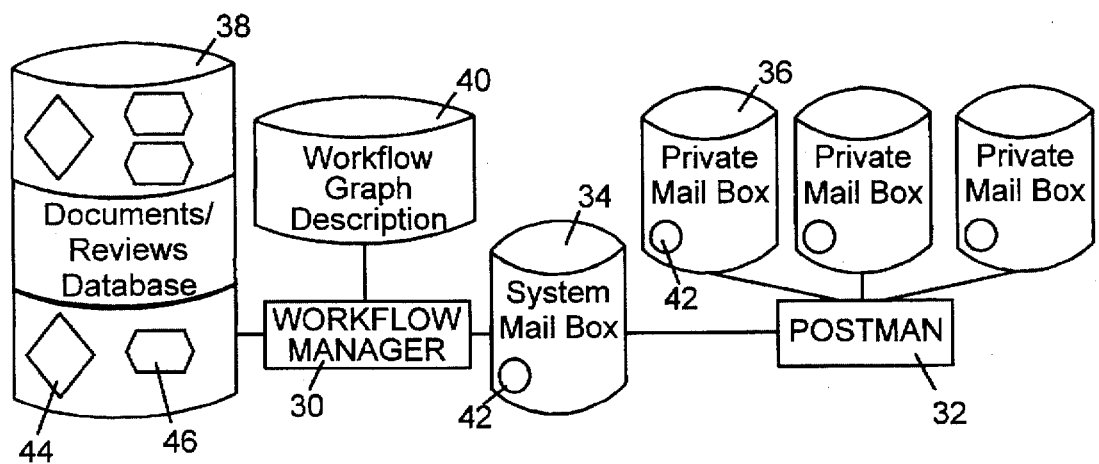
FIG. 2 is a schematic diagram illustrating the basic components in a system incorporating the method of this invention.

All components presented in FIG. 2 reside on server computer 24. A designer specifies the application to be implemented by entering a workflow graph description 40 into the system. In the current embodiment, workflow graph description 40 is stored as a set of records in a database using a database management system. The particular procedures for accessing a database, programmatically or via a user interface, or for accessing electronic mail components are well known to those skilled in the art.

A preparer accesses a documents/reviews database 38 and creates a document 44. A workflow manager 30 examines document 44, examines workflow graph description 40, and deposits one or more notifications 42 into a system mail box 34. A postman program 32 permanently monitors system mail box 34 and dispatches notifications 42 to appropriate private mail boxes 36 based on the electronic identity specified in each notification 42. A reviewer retrieves notification 42 and identifies document 44 to be reviewed. After analyzing document 44, the reviewer composes a review 46 into documents/reviews database 38.

Workflow manager 30 again examines document 44 and its associated reviews 46, and eventually deposits another notification 42 into system mail box 34. The process continues until document 44 is declared reviewed.

The elements that are essential for the current invention comprise specific attributes of notifications 42, documents 44, reviews 46, attributes of the workflow graph via a suitable description 40, and the system engine, workflow manager 30. The rest of the components, such as components for accessing database elements, user interfaces, and electronic mail systems are standard, well known to persons of ordinary skill in the art.

5.2. The Workflow Objects Hierarchy

Document 44 is a collection of information to be reviewed. To improve the quality and performance of the review process, reviewers are specialized and evaluate aspects of document 44 that fall within their area of expertise. Some reviewers can review details of document 44 independently from other details. Others can integrate the results of previous reviews and rank document 44 according to, for example, how well various aspects interrelate. Independent aspects can be evaluated in parallel, thus reducing the overall evaluation time for document 44.

Figure 3:
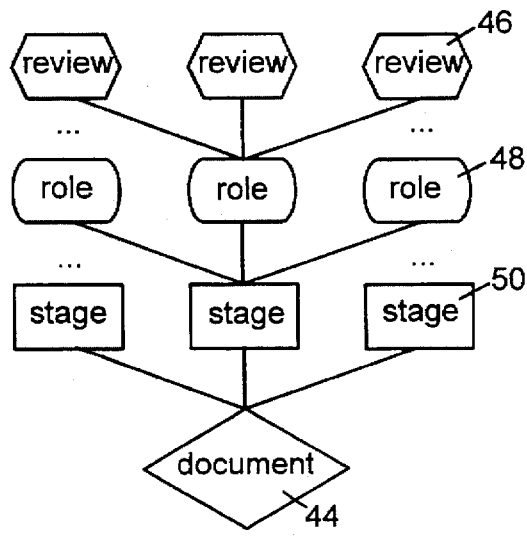
FIG. 3 illustrates the workflow object hierarchy used in the general method of this invention.

As illustrated in FIG. 3, each document 44 is associated a plurality of reviews 46. Each review 46 is composed by an individual reviewer, refers to, and expresses the personal opinion of the reviewer with respect to, a well defined aspect of document 44.

Each aspect of document 44 corresponds to a role 48 which a reviewer assumes when evaluating the aspect. Various aspects of document 44 can have elements in common, and can even include all elements of other aspects. For a particular document 44, a role 48 associates all reviewers authorized (and notified) to review the aspect corresponding to role 48 through one of its properties. A role facilitates the definition of the workflow in terms of document aspects instead of reviewer identities.

Reviewers playing particular roles can review document 44 in parallel, as long as the information they review is available. Other roles can be reviewed provided that specific roles have already been reviewed. For example, a final reviewer can rely on the evaluation of one or more specialized reviewers (experts) to make a decision regarding document 44. The stage concept captures this data dependency.

A stage acts as a synchronization barrier. In FIG. 3, all roles 48 that must be reviewed before attempting to review other roles are associated to a stage 50. In the above example, the final reviewer can attempt to review document 44 if all the experts' reviews have been finalized.

Document 44 is evaluated in stages. Only after the aspects corresponding to a stage have been reviewed, workflow manager 30 triggers the review of the next stage. Various synchronization patterns can be defined for the evaluation of document 44, by means of a special construct called a workflow graph, discussed next.

Reviews 46, roles 48, stages 50, and documents 44 are collectively called workflow objects. The diagram in FIG. 3 highlights the review relationship between workflow objects: to review document 44 a plurality of stages 50 must be reviewed; to review a stage 50 a plurality of roles 48 must be reviewed; to review a role 48 a plurality of reviews 46 must be finalized. Notice that a role 48 can be associated to more than one stage 50.

Generally, not all reviewers associated to role 48 need to review document 44. The condition to meet in order to declare role 48 reviewed is called the criterion to finalize the role, and may take into account data in all reviews 46 associated to role 48. Further, not all roles 48 associated to stage 50 need to be reviewed in order to declare stage 50 reviewed. The condition is called the criterion to finalize the stage, and may take into account data in all roles 48 associated to stage 50. Finally, not all stages 50 associated to document 44 must be reviewed in order to declare document 44 reviewed. The condition is called the criterion to finalize the document, and may take into account data in all stages associated to document 44.

On an exception basis, the normal review process can be interrupted if a criterion to stop is satisfied. The review criterion to stop is evaluated at the beginning of each processing of document 44 and may take into account data in all reviews 46 associated to document 44. A role criterion to stop is associated to role 48 and is evaluated whenever role 48 is evaluated. A stage criterion to stop is associated to stage 50 and is evaluated each time stage 50 is evaluated. Finally, the document criterion to stop is associated to document 44 and is evaluated each time document 44 is processed. Notice that the document criterion to stop is equivalent to the criterion to finalize the document. As a result, the current embodiment provides only a document criterion to stop. Any of the review, role, stage, and document criteria to stop may be disabled.

5.3. The Workflow Graph

FIG. 4 presents an example of a workflow map, schema, or graph 52, which describes a particular document evaluation process, namely for a project proposal application.

Generally, work flow graph 52 is a collection of triplets and doublets. A triplet is represented as (s1, r, s2), where s1 is a source stage, r is a role, and s2 is a target stage, and a doublet is represented as (s, c), where s is a stage and c is a cc role. The order in which the elements of the tuple are specified is important. The second element in a triplet must be a role 48 and the other two elements must be stages 50; also, triplet (s1, r, s2) is different from triplet (s2, r, s1). In FIGS. 4 and 5 a triplet is represented by the respective role, stages, and two arrows-one from the source stage to the role, and the other from the role to the target stage. In triplet (s1, r, s2) role r is said to be incoming, or incident, into target stage s2, and outgoing from source stage s1. In FIG. 4 a doublet is represented by the respective stage and cc role, and an arrow from the stage to the cc role.

For the purpose of this invention, work flow graph 52 must satisfy an additional condition, namely to be a feed-forward workflow graph. A feed-forward workflow graph is defined using the concept of path. A path connecting two stages s1 and sn in workflow graph 52 is an ordered collection of stages, denoted {s1, s2, ..., sn}, such that there is at least one role connecting each of two consecutive stages in the collection. A feed-forward work flow graph is a workflow graph 52 in which there are no paths connecting a stage si with itself.

In the example in FIG. 4, roles 48 are labeled software, platform, pricing, competitors, feasibility, marketability, copyright, staff, funds, final, and strategy, corresponding to the respective aspects of document 44 to be reviewed. The cc roles are labeled pricing_cc, feasibility_cc, final_cc, and strategy_cc. Stages 50 are labeled s1 through s7. Work flow graph 52 is uniquely defined for this example by the following collection of triplets: (s1, software, s2), (s1, platform, s2), (s1, pricing, s3), (s1, competitors, s3), (s2, feasibility, s4), (s2, copyright, s5), (s3, marketability, s4), (s4, staff, s5), (s4, staff, s6), (s4, funds, s5), (s4, funds, s6), (s5, final, s7), and (s6, strategy, s7), and by the following set of doublets: (s1, pricing_cc), (s2, feasibility_cc), (s5, final_cc), and (s6, strategy_cc).

The particular configuration of workflow graph 52 describes the following evaluation strategy.

Initially, notifications 42 are sent to all the software, platform, pricing, and competitors reviewers who evaluate their respective aspects of document 44 in parallel. At the same time, the pricing_cc observers are also notified. When both software and platform aspects have been reviewed, notifications 42 are sent to the copyright and feasibility reviewers, and to the feasibility_cc observers in parallel. Similarly, when both pricing and competitors aspects have been reviewed, one notification 42 is sent to the marketability reviewer.

Only after feasibility and marketability aspects have been reviewed, notifications 42 are sent in parallel to the staff and funds reviewers. When both the staff and funds aspects have been reviewed, a notification 42 is sent to the strategy reviewer, and to the strategy_cc observers. If, in addition, the copyright aspect has also been reviewed, notification 42 is sent to the final reviewers, and to the final_cc observers.

Notice that according to this particular schema, it is possible that the marketability reviewers review document 44 in parallel with the software, platform, feasibility, and copyright reviewers. However, a marketability reviewer will not review document 44 in parallel with pricing or competitors reviewers since stage s3 specifies that the marketability aspect be reviewed only after both pricing and competitors aspects have been reviewed. Similarly, a marketability reviewer will not review document 44 in parallel with staff and funds reviewers, and by transitivity, not in parallel with final and strategy reviewers.

Workflow graph 52 describes the most complex synchronization schema that may be needed for any document 44. A particular document 44 may comprise no information pertaining to certain aspects, and consequently, may not require a review for a particular role 48. In this case, the evaluation of document 44 proceeds as if the particular role 48 were not in workflow graph 52.

5.4.. Basic Configurations in a Workflow Graph

FIGS. 5A through 5D illustrate the four basic configurations used in assembling a workflow graph 52.

Figure 5A:
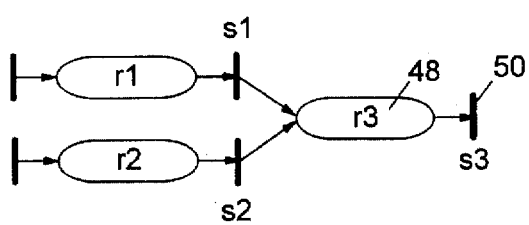

A role merge configuration is obtained whenever there are at least two triplets with the same role and target stage (in FIG. 5A, (s1, r3, s3) and (s2, r3, s3)). Whenever either one of the stages s1 or s2 are reviewed, a notification is sent to reviewer r3. This way, it is possible that reviewer r3 reviews aspects of document 44 in parallel with reviewers r1 or r2. However, even if aspect r3 is reviewed, stage s3 will be reviewed when both stages s1 and s2 are reviewed.

Figure 5B:
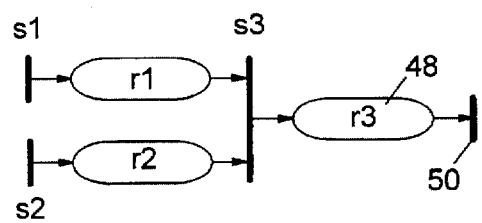

A stage merge configuration is obtained whenever there are at least two triplets with the same target stage (in FIG. 5B, (s1, r1, s3) and (s2, r2, s3)). Whenever both aspects r1 and r2 are reviewed, notification 42 can be sent to role r3. Reviewers r3 review aspects of document 44 only after the evaluation of aspects r1 and r2 ended.

Figure 5C:
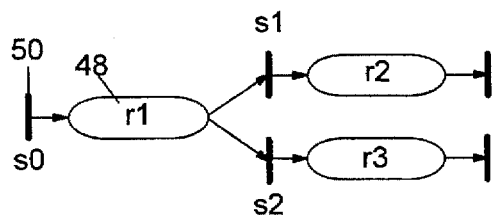

A role fork configuration is obtained whenever them are at least two triplets with the same role and source stage (in FIG. 5C, (s0, r1, s1) and (s0, r1, s2)). Whenever aspect r1 has been reviewed, stages s1 and s2 are reviewed (with some restrictions, discussed below) and notifications 42 are sent to reviewers r2 and r3.

Figure 5D:
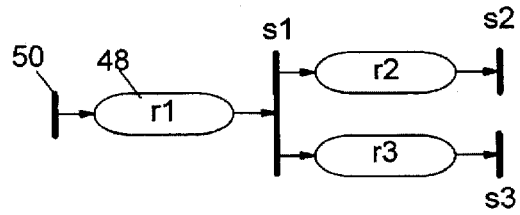

A stage fork configuration is obtained whenever there are at least two triplets with the same source stage (in FIG. 5D, (s1, r2, s2) and (s1, r3, s3)). Whenever role r1 is reviewed, stage s1 is also reviewed and notifications 42 are sent in parallel to reviewers r2 and r3.

It would seem that a role fork configuration is equivalent with a stage fork configuration. However, as illustrated in FIG. 4 for role staff and stages s5 and s6 (a role fork configuration), this is not the case. The reason is that role copyright is also incident into stage s5. Role strategy is notified when both staff and funds roles are reviewed, while role final is notified when all of staff, funds, and copyright roles are reviewed. Such properties cannot be obtained with a stage fork configuration.

5.5.. Data Components and Functional Properties of Workflow Objects

Workflow manager 30 is the engine that drives the document evaluation process described by workflow graph 52. While processing document 44 and all its associated reviews 46, workflow manager 30 uses information stored in workflow graph 52, in document 44, and in its associated reviews 46. The information pertains to the defined workflow objects: reviews 46, roles 48, stages 50, and documents 44. Part of this information, the data component, is stored in each document and review, and keeps track of the review status of each object. The functional properties are stored in workflow graph 52 as symbolic values and code fragments, and instruct workflow manager 30 how to proceed in various circumstances.

FIGS. 6A through 6D present the data components and functional properties associated to each type of workflow object.

5.5.1. Review

Figure 6A:
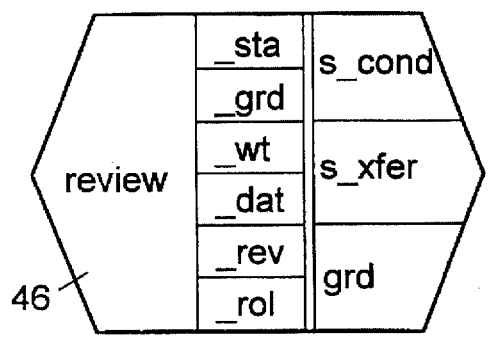

As illustrated in FIG. 6A, the data components of review 46 (stored in the review itself) comprise:

(a) status information (_sta). A reviewer can prepare his review 46 in a certain amount of time. During this period, the review is not ready to be considered by workflow manager 30 and its status is In Preparation. When the review is definitive and ready to be taken into account for review purposes, the reviewer changes the status of the review to Finalized. The system can prevent the reviewer to further modify his review 46 to avoid inconsistencies between the data in document 44 as calculated by workflow manager 30 and the data in its associated reviews 46, (b) rank information (_grd). The reviewer can assign a grade to document 44 to grade the aspects under consideration, (c) weight information (_wt). The reviewer himself can associate a weight to the grade he assigned, for example, to represent his confidence degree in his evaluation. Alternatively, the system can associate a predefined weight that a supervisor assigns to each reviewer, to represent the confidence of the supervisor in reviewer's evaluation, (d) date information (_dat) identifies the time and date when review 46 is finalized, (e) reviewer identity (_rev) specifies the reviewer who composed the review, (f) role information (_rol). A reviewer can evaluate more than one aspect of document 44. To eliminate the ambiguity in such cases, the reviewer explicitly specifies the reviewed aspects.

A generic review is an abstract object defined for the express purpose of associating all functional properties to a single object rather than to each and every review 46 created by a reviewer. The functional properties associated to the genetic review apply to all reviews 46 and are stored in workflow graph 52:

(a) stop condition (s_cond) is a program fragment that returns a Boolean value. If the result is TRUE then the normal document evaluation sequence is abandoned and document 44 is finalized. Otherwise, the normal evaluation is not affected. The review stop condition is evaluated for each review 46 regardless of whether role 48 associated to review 46 is or is not finalized. In the current embodiment, the stop condition is evaluated in the context of review 46. Generally, the stop condition may also be evaluated in the context of document 44, or if the programming language allows, in the context of both document 44 and review 46, (b) transfer on stop (s_xfer) is a program construct that is executed whenever the stop condition associated to review 46 is TRUE, in order to transfer data from review 46 into document 44. The transfer on stop action may be disabled, (c) grade formula (grd) specifies how to compute a unique grade, assuming that a reviewer finalizes more than one review 46 for the same role 48 for document 44. A unique grade can be computed, for example, by taking the maximum (MAX) or the minimum (MIN) of the existing values; or by adding (SUM), averaging (AVG), or counting (CNT) the existing values. Also, based on the_dat value, the grade can be the one specified in the earliest (EARLIEST) or latest (LATEST) reviews. (Notice that EARLIEST and LATEST also select a "relevant" review, instead of only computing a unique grade.)

5.5.2. Role

Figure 6B:
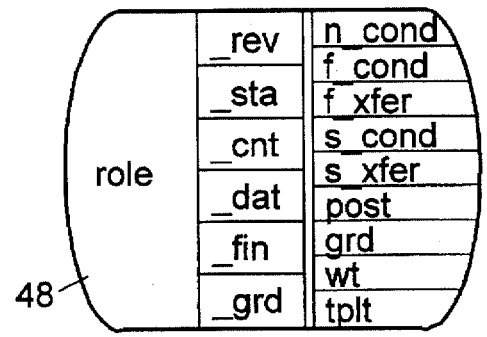

As illustrated in FIG. 6B, the data components of role 48 (stored in document 44) comprise:

(a) list of reviewers (_rev) authorized to review the aspects defined by role 48; the list can be computed at various times, for example, by external logic at the time document 44 is submitted for review, or even while document 44 is in review before role 48 has been notified, by the code fragments invoked by workflow manager 30, (b) status information (_sta). Before any notification 42 has been sent to the reviewers associated to role 48, status is Not Processed. When the first notification 42 has been sent to the reviewers associated to role 48, the status of role 48 changes to Notified. When at least one reviewer has finalized a review 46 for role 48 status changes to Incomplete. When the criterion to finalize the role is satisfied, status changes to Tentatively Finalized. When all stages 50 for which role 48 is an incoming role are finalized, status changes to Finalized. Notice that while role 48 is in any state except Finalized, all reviews for role 48 are considered when evaluating role 48. When role 48 is Finalized, subsequently finalized reviews 46 are no longer taken into account, even if the system allows a reviewer to compose such reviews, (c) notification counter (_cnt). When no notifications have been sent, it contains a NULL value. After the first notification has been sent, it contains the actual number of notifications sent for role 48, (d) notification date information (_dat). Identifies the time and date when the latest notification has been sent to reviewers for role 48, (e) finalized date information (_fin). Identifies the time and date when role 48 has been finalized. NULL if role 48 is not Finalized, (f) rank information (_grd). Workflow manager 52 computes a rank for role 48 based on the ranks of the associated reviews 46 (see FIG. 3). Field_grd stores this grade.

For each role 48 in workflow graph 52 relevant for document 44, a set of role data components is stored in document 44.

The functional properties of role 48 are stored in the representation of workflow graph 52, and comprise:

(a) number to finalize (n_cond) is one type of criterion to finalize the role that takes into account the number of reviews 46 which are available and finalized for role 48. Examples are, ONE, ALL, and quorum (percentage). A value of ONE specifies that only one review 46 is sufficient to finalize role 48. A value of ALL specifies that all reviewers must compose reviews 46 in order to finalize role 48. A quorum specifies that only a fraction of the designated reviewers need to finalize reviews 46 in order to finalize role 48, (b) condition to finalize (f_cond) is another type of criterion to finalize the role which can take into account particular values in document 44 and/or reviews 46. It is specified as a program fragment which returns a Boolean value. In the current embodiment, the condition to finalize is evaluated in the context of document 44. Alternatively, it can be evaluated in the context of all reviews 46 associated to role 48 or, if the programming language allows, in both. The condition to finalize may also be disabled, (c) transfer on finalize (f_xfer) is a program construct that is executed whenever the criterion to finalize the role (either number to finalize or condition to finalize) is satisfied, in order to transfer data from the relevant reviews 46 to document 44. The transfer on finalize action may be disabled, (d) stop condition (s_cond) is a program construct that returns a Boolean value. If the result is TRUE then the evaluation process is stopped and document 44 is finalized. In the current embodiment, the condition to stop is evaluated in the context of document 44. Alternatively, it can be evaluated in the context of all reviews 46 associated to role 48 or, if the programming language allows, in both, (e) transfer on stop (s_xfer) is a program fragment that is executed whenever the stop condition associated to role 48 is satisfied, and transfers data from relevant reviews 46 associated to role 48 into document 44. The transfer on stop action may be disabled, (f) post finalize formula (post) is a program fragment that is executed whenever the status of role 48 changes to Finalized, in the context of document 44. It can be used to clean-up temporary fields and to update standard fields when the evaluation of document 44 is interrupted because of the role stop condition, (g) grade formula (grd) specifies the method used to compute a grade for role 48 from finalized reviews 46 composed by authorized reviewers. The role grade can be computed, for example, by taking the maximum (MAX) or minimum (MIN) of the associated existing review grades (see FIG. 3); by adding (SUM), averaging (AVG), or counting (CNT) the associated review grades; or by computing a weighted sum (WSUM) or weighted average (WAVG), where the weights are data components associated to reviews 46 (see FIG. 3), (h) weight (wt). The weight is associated with role 48 and quantifies the importance of the corresponding aspect in the overall evaluation of document 44, (i) template (tplt) is a program fragment which is executed in the context of document 44 whenever a notification needs to be sent to the reviewers authorized to review role 48, or to the observers associated to role 48. It returns a string which identifies the notification template to be used.

5.5.3. Stage

Figure 6C:
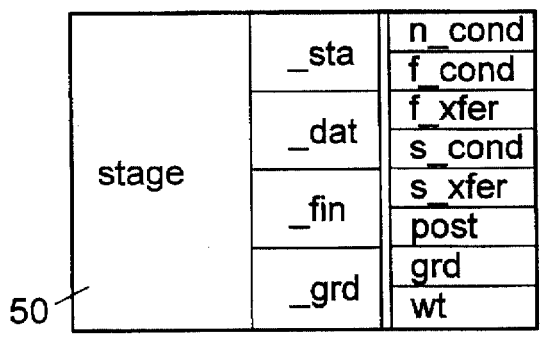

As illustrated in FIG. 6C, the data components of stage 50 are:

(a) status information (_sta). Stage 50 can be in one of the following four states, Not Processed, Arrived At, Incomplete, and Finalized. Stage 50 is Not Processed when there are reviewers listed in roles 48 incoming into stage 50 who have not been notified yet. Whenever all reviewers corresponding to roles 48 incoming into stage 50 have been notified, the status of stage 50 is Arrived At. Whenever some of the roles 48 incoming into stage 50 have been tentatively finalized, but the criterion to finalize the stage is not satisfied, the status of stage 50 is Incomplete. Finally, when the criterion to finalize the stage has been satisfied, status of stage 50 is Finalized, (b) arrived at date information (_dat) identifies the time and date when stage 50 has been arrived at, (c) finalized date information (_fin) identifies the time and date when stage 50 has been finalized. Field contains NULL if stage 50 is not Finalized, (d) rank information (_grd). Workflow manager 52 computes a rank for stage 50 based on the ranks of associated roles 48 (see FIG. 3) and stores it into this field.

For each relevant stage 50 in workflow graph 52, a set of stage data components is stored in document 44.

The functional properties of stage 50 are stored in workflow graph description 40, and comprise:

(a) number to finalize (n_cond) is one type of criterion to finalize the stage that takes into account the number of finalized roles 48 incoming into stage 50. Examples are, ONE, ALL, and quorum (percentage). A value of ONE specifies that only one role 48 needs to be finalized in order to finalize stage 50. A value of ALL specifies that in order to finalize stage 50, all roles 48 incoming into stage 50 and with at least one associated reviewer must be finalized. A quorum specifies that only a fraction of the incoming roles 48 need to be finalized in order to finalize stage 50, (b) condition to finalize (f_cond) is another type of criterion used to decide whether or not stage 50 is finalized. It can take into account particular values in document 44 and/or reviews 46. It is specified as a program fragment which returns a Boolean value. In the current embodiment, the condition to finalize is evaluated in the context of document 44. Alternatively, it can be evaluated in the context of all reviews 46 associated to all roles 48 associated to stage 50 or, if the programming language allows, in both. The condition to finalize may also be disabled, (c) transfer on finalize (f_xfer) is a program construct that is executed whenever any of the criteria to finalize the stage (either number to finalize or condition to finalize) is satisfied, in order to transfer data from reviews 46 to document 44. The transfer on finalize action may be disabled, (d) stop condition (s_cond) is a program fragment that returns a Boolean value. If the result is TRUE then the document evaluation process is stopped and document 44 is finalized. In the current embodiment, the stop condition is evaluated in the context of document 44. Alternatively, it can be evaluated in the context of all reviews 46 associated to all roles 48 associated to stage 50 or, if the programming language allows, in both, (e) transfer on stop (s_xfer) is a program construct that is executed whenever the stop condition associated to stage 50 is satisfied, in order to transfer data from relevant reviews 46 associated to roles 48 associated to stage 50 into document 44. The transfer on stop action may be disabled, (f) post finalize formula (post) is a program fragment that is executed in the context of document 44 whenever the status of stage 50 changes to Finalized. It can be used to clean-up temporary variables and to update standard fields when the evaluation of document 44 is interrupted because of the stop condition, (g) grade formula (grd) specifies the method used to compute a grade for stage 50 from those tentatively finalized roles 48. The grade can be computed, for example, by taking the maximum (MAX) or minimum (MIN) of the associated role grades (see FIG. 3); by adding (SUM), averaging (AVG), or counting (CNT) the associated review grades; or by computing a weighted sum (WSUM) or weighted average (WAVG), where the weights are those associated to roles 48 (see FIG. 3), (h) weight (wt). The weight is associated with stage 50 and quantifies the importance of the evaluation stage in the overall evaluation of document 44.

5.5.4. Document

Figure 6D:
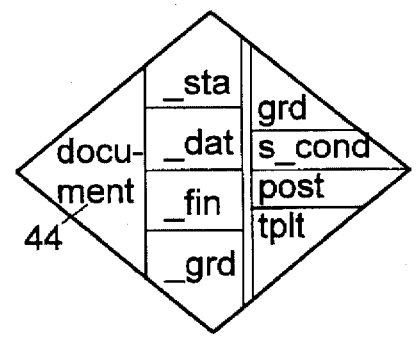

As illustrated in FIG. 6D, the data components of document 44 (stored in document 44) are:

(a) status information (_sta). Document 44 can be in one of three states. While the preparer is assembling data for review, status is In Preparation. When the preparer has completed preparing document 44, she submits it and status is changed to In Review by the form logic. While in this state, the preparer can no longer modify document 44, in order to prevent inconsistencies between the status of document 44 as calculated by workflow manager 30 and as modified by the preparer. Whenever all stages 50 in workflow graph 52 have been finalized, or when the stop condition for review 46, role 48, stage 50, or document 44 has been satisfied, the status of document 44 is changed by workflow manager 30 to Finalized, (b) submission date information (_dat) identifies the time and date when document 44 has been submitted for review, (c) finalized date information (_fin) identifies the time and date when document 44 has been finalized, (d) rank information (_grd). Workflow manager 52 computes a rank for document 44 based on the ranks of the associated stages 50 (see FIG. 3) and stores it in this field.

Similar to a generic review, a generic document is an abstract object defined for the purpose of grouping and associating the functional properties to a single object. The functional properties associated to the generic document apply to all documents 44, and are stored in the representation of workflow graph 52:

(a) grade formula (grd) specifies the method used to compute a grade for document 44 from grades for stages 50. For example, the grade for document 44 can be computed by taking the maximum (MAX) or minimum (MIN) of the stage grades; by adding (SUM), averaging (AVG), or counting (CNT) the stage grades; or by computing a weighted sum (WSUM) or weighted average (WAVG) of the stage grades. The weights, if applicable, are the data components associated to each stage 50 (see FIG. 3 and FIG. 6C), (b) condition to stop (s_cond) is a program fragment that returns a Boolean value. If the result is TRUE then the evaluation process is stopped and document 44 is finalized. In the current embodiment, the condition to stop is evaluated in the context of document 44. Alternatively, it can be evaluated in the context of all reviews 46 or, if the programming language allows, in both, (c) post finalize formula (post) is a program fragment that is executed whenever the status of document 44 changes to Finalized, in the context of document 44. It can be used to clean-up temporary fields and to update standard fields when the evaluation of document 44 is interrupted because of a stop condition, (d) template (tplt) is a program fragment which is executed in the context of document 44 whenever the status of document 44 changes to Finalized. It returns a string which identifies a notification template to be used, for example, to inform the preparer that document 44 has been finalized, or to gather approval/rejections letters into a special database.

5.6. External Representation of Workflow Graph

In order to build a particular workflow application, a designer provides facilities to create, store, access, modify, delete documents and reviews, typically using a database management system. Each logical document and/or review can be implemented using a plurality of physical records. In the current embodiment, a document/review is implemented as a single Lotus Notes document, and all document related operations are provided by the Lotus Notes environment.

(2) defines the data components in the structure of each document and review. Document 44 stores data components for each role 48 and stage 50 relevant for its particular contents. Lotus Notes allows to dynamically create fields into a document. In the current embodiment, each data component of a role 48, for example, is a Lotus Notes field whose name is obtained by concatenating the name of the role with a unique suffix that identifies the data component (e.g., _cnt).

(3) specifies the topology of workflow graph 52 using, for example, a set of records in a database. In the current embodiment, Lotus Notes can store lists of text elements into a field, which allows a designer to specify pseudo-triplet (s1, {r1,r2}, s2) instead of triplets (s1, r1, s2), and (s1, r2, s2), (4) specifies the functional properties for each role and stage defined in workflow graph 52, as well as for a generic document and a generic review. In the current embodiment, the functional properties for document and review, as well as the default values for the role and stage functional properties are defined in a single Lotus Notes document. Each of the roles 48 and stages 50 with functional properties different from the default values are explicitly defined in separate Lotus Notes documents.

FIG. 7A presents a pictorial representation of a triplet in the current embodiment. FIG. 7B presents the functional properties associated to a particular role 48, and FIG. 7C presents a pictorial representation of functional properties associated to a particular stage 50.

Generally, any programming language can be used to define functional properties, provided that program fragments can be interpreted at run time from within workflow manager 30. The more powerful the programming language is, the more flexible work flow manager 30 will be. In the current embodiment, the Lotus Notes @function language is used.

An application designer for the Rank Workflow system utilizes the following additional features:

(5) Rank Workflow stores all program fragments as text and compiles them when needed for the first time. For performance reasons, formulae are typically named and the names are subsequently used when specifying functional properties. FIG. 7D presents a formula specification. Formulae in Lotus Notes can be evaluated in the context of any document, including document 44 and reviews 46.

(6) Lotus Notes lacks sophisticated relational capabilities which makes it impossible to present data pertaining to more than one physical record on the same screen. Consequently, the current embodiment provides facilities to move and process data from reviews 46 to documents 44, via transfer actions. Generally, a transfer action can be defined between a source and a destination Lotus Notes document. In a relational database system, this feature can be replaced by marking reviews 46 as relevant. As exemplified in FIG. 7E, a transfer action comprises the following components:

- a name used to identify it in lists of transfer actions, like for role competitors in FIG. 7B,
- a condition formula which returns a Boolean value,
- a destination field name,
- an action formula which may return any value,
- an optional post assignment formula which has only side effects.

In the current embodiment, the condition formula is evaluated in the destination document. Generally, the condition formula can be evaluated in the source document, the destination document, or if the programming language allows, in both. If the result is FALSE then the execution of the transfer action stops. Otherwise, the action formula is evaluated in the source document and its return value is assigned to the destination field in the destination document. Finally, if defined, the post assignment formula is evaluated in the context of the destination document.

The execution of transfer action trsfRejectJustification, specified in FIG. 7E, proceeds as follows. Condition @True is evaluated in the context of document 44 and produces the result TRUE, which allows the transfer action to continue. The action formula is evaluated in the context of review 46 and produces a string that contains a delimiter, the name of the reviewer prefixed by the label "Reviewer:" followed on the next line by the actual justification. The resulted string is assigned to temporary variable dcTmp in document 44, and the post assignment formula is executed in the context of document 44. Field dcJustification is appended the value of field dcTmp and field dcTmp is deleted from document 44 thereafter. The post assignment formula returns TRUE. Notice that rvReviewer and rvJustification are fields in review 46, while dcJustification and dcTmp are fields in document 44.

(7) Rank Workflow uses notification templates to define the appearance, contents, and recipients of notifications 42. The underlying Lotus Notes electronic mail layer uses two types of recipients (the to recipients in Rank Workflow are reviewers and the cc recipients are observers of the evaluation process), a message originator (the from field), a short description of the contents of the message (the subject field), and the body of the message. The message body also stores format information, including fonts, sizes, colors, and tables. Other systems (WIT™ The API Library™, a product from Application Partners, Inc. of Iselin, N.J.) build electronic mail messages programmatically, by assembling each component separately. Rank Workflow allows a designer to specify the body of the message directly, as she would specify a real message. In addition, Rank Workflow substitutes program fragments that appear in the to, cc, from, subject, and body of a template with the result obtained by evaluating the respective program fragment in the context of document 44. As illustrated in FIG. 7F, a notification template comprises in addition to the to, cc, from, subject, and body specifications:

- a name used to associate notification template to role 48,
- delta no action (d_na) specifies the minimum time interval from the previous notification required to have elapsed in order to send another notification, when a reviewer took no action with respect to a document 44,
- delta in review (d_ir) is used when a reviewer composed a review 46 but did not finalize it, and specifies the minimum time interval from the moment the review was composed, required to have elapsed in order to send another notification.

Each role 48 can specify its own notification template. The body of the notification can specify, for example, which are the aspects of document 44 that need to be reviewed and which form to be used to compose review 46. In addition, the notification can provide some details from the document itself. FIG. 7G illustrates the notification obtained by expanding notification template in FIG. 7F for a particular document.

Notification templates can be used to implement an escalation schema. Assuming that a reviewer for a certain role receives a notification and takes no action within a specified time frame, the logic in the role can send a second notification, formulated differently, to the same reviewer along with a copy to a supervisor. Alternatively, the role logic can replace the primary reviewer with a secondary one and send the second notification to this latter reviewer.

A reviewer can foresee that it might take her longer than the allotted time to prepare a review 46 and may choose to ask for an extension, by marking her review 46 In Preparation. In this case, the system can allow the reviewer more time before sending the second notification or before escalating the review request to the secondary reviewer.

5.7. Internal Representation of Workflow Graph

Workflow manager 30 translates workflow graph description 40 into an internal representation, which is stored in the memory of server computer 24, and is well suited for processing each document 44 and its associated reviews 46. A schematic of the internal representation of workflow graph 52 is presented in FIG. 8.

The techniques used to translate the external representation of workflow graph 52 into the internal representation are standard techniques studied in the curricula of most departments of computer science and are known to persons with ordinary skills in the art.

objIdTable 100 is a two dimensional array of characters used to uniquely store identifiers encountered while parsing the external representation of workflow graph 52. For example, when a role properties are read, the role name is first sought into objIdTable 100. If the name exists then its address is used, otherwise the name is first inserted into the table and the new address is used. As a result, no duplicate names are stored into the system.

Lotus Notes formulae are stored in a formula table. Each entry in this table is a formula object objFormula 102, comprising:

- a name, which is a pointer to an entry in objIdTable 100,
- a pointer to the text representation of the formula in a text formula space (f_txt),
- a pointer to the compiled representation of the formula in a compiled formula space (f_exe).

A formula is read from workflow graph description 40 (FIG. 7D) and is stored into a text formula space and the formula table. Whenever the formula is evaluated in the context of a document, Rank Workflow first checks if it has been compiled. If not, Rank Workflow compiles it and stores the executable code into the compiled formula space. A pointer to the code is stored in objFormula 102. Then the formula is evaluated in the context of the proper document.

Transfer actions (FIG. 7E) are stored into a transfer action table. Each entry in this table is a transfer object objTransfer 104. The name and dest fields of objTransfer 104 are pointers to entries in objIdTable 100. Elements cond, act, and post are pointers to objFormulae 102. The behavior for transfer actions, described previously, is implemented as a primitive operation in Rank Workflow.

Individual names are stored into objIdTable 100 and are identified in other constructs as pointers to the respective entry. In order to specify a collection of such entries, a special data structure is needed, an id cell object objIdCell 108a. An object of this type stores two pointers. The name pointer refers to an entry in objIdTable 100 while the next pointer points to another objIdCell 108b. The next component allows chaining of objIdCells. A NULL pointer in the next component indicates that the cell is the last cell in the list.

objIdCells 108 are stored into an id cell table. Since objIdCells 108 are allocated and deallocated dynamically during Rank Workflow operation, the id cell table structure also chains all available objIdCells into a free list. objIdCells are deallocated from the free list when they are needed and are returned to the pool of available cells when they are no longer needed.

Similar to lists of objIdCells 108, lists of transfer objects objTransfer 104 can be built using objTransferCells 110.

Notification templates are also stored in a table. An entry in the notification template table, objTemplate 106, comprises the following elements:

the name of the template is a pointer to an entry in objIdTable 100, d_na specifies the time interval between notifications; if a reviewer does not take any action, Rank Workflow sends a second notification at least d_na seconds apart from the previous notification, d_ir specifies the time interval a reviewer is spared from a new notification if she has prepared a review but has not finalized it, to and cc are lists of objIdCells, or more precisely, pointers to the first objIdCell 108a in a list of objId-Cells. The empty list is denoted by a NULL pointer, from, subject, and body are pointers to a text space where the respective notification items are stored. Each item can include constructs in a programming language which are evaluated and substituted in an actual notification, c_to and c_cc are initialized as NULL pointers each time the evaluation of document 44 and its associated reviews 46 is started. During the evaluation, these lists of objIdCells 108 accumulate the actual recipient names associated with the notification.

Functional properties of reviews, documents, roles, and stages are stored using an objProperties data structure 112. Its components are, n_cond—an integer between 0 and 100; 0 specifies ONE, 100 specifies ALL, and anything else specifies a percentage, f_cond, s_cond, and post—are pointers to objFormulae 102. If there is no formula specified in the external representation then this field contains a NULL pointer, f_xfer and s_xfer are pointers to a list of objTransfer-Cells 110, or more precisely, pointers to the first cell in the list 110a. If there is no transfer action specified, this pointer is NULL, wt stores the weight associated with the object to which it belongs, grd stores an integer (symbolic) value that specifies how to compute the grade of document 44, stage 50, or role 48 from the grades of the associated stages 50, roles 48, and reviews 46 respectively.

An objProperties structure 112 is an object in itself when it refers to documents 44 and reviews 46; however, some of its components are not used in these cases. An objProperties structure 112 is a component of a role object objRole 114 and of a stage object objStage 116.

Role object objRole 114 is a basic component of workflow graph 52 and comprises:

name stores a pointer to a particular entry in objIdTable 100, ap is an instance of an objProperties structure 112, tf contains either a pointer to an objTemplate 106 (field tplt) or a pointer to an objFormula 102 (field frma). When evaluated, the formula returns the name of an objTemplate 106, lim is an integer that specifies at most how many notifications to send out, fin is a Boolean variable used internally by Rank Workflow to mark a role as tentatively finalized. Tentatively finalized roles become Finalized when the stage 50 in which role 48 is incident is Finalized.

Similar to lists of identifiers, Rank Workflow uses lists of role objects objRoleCells 118, and lists of stage objects objStageCells 120.

Stage object objStage 116 is the second basic element of workflow graph 52 and comprises:

name stores a pointer to an entry of objIdTable 100, prv_stage and nxt_stage contain pointers to lists of stages, or more precisely, to the first objStageCell 120 in a list.

prv_stage lists all ancestors of the current stage. An ancestor of a stage s0 is (i) any stage s1 such that there is a role r and a triplet (s1, r, s0) in workflow graph 52, or (ii) any stage s2 such that there is a role r, a stage s1 which is an ancestor of s0, and a triplet (s2, r, s1) in workflow graph 52.

The list of ancestors for each stage s0 in workflow graph 52 can be computed using a classic graph traversal algorithm, known to a person skilled in the art, or can be specified by the designer explicitly.

nxt_stage contains all direct descendants of the current stage s0, that is, any stage s1 such that there is a role r and a triplet (s0, r, s1) in workflow graph 52.

to_send, to_wait, and cc_send all contain pointers to role lists, or more precisely to the first objRoleCell 118 in a list. For a stage s0, (i) to_send lists all roles r such that there is a stage s1 and a triplet (s0, r, s1) in workflow graph 52, (ii) to_wait lists all roles r such that there is a stage s1 and a triplet (s1, r, s0) in workflow graph 52, (iii) cc_send lists all roles that must be cc'd when stage s0 is finalized. The cc_send list is specified by the user in the external representation of a stage (see FIG. 7C, the line labeled CCs).

ap has the structure of objProperties 112 and stores the functional properties of stage 50.

All structures discussed so far pertain to workflow graph 52 and are the same irrespective of what documents 44 are being processed. At any time, Rank Workflow analyzes one document 44 and all its associated reviews 46. It first identifies the reviews 46 associated to document 44, extracts the information that is absolutely necessary during processing, and stores it into a Review table. If subsequent transfer actions refer to particular reviews 46, they are accessed again. The strictly necessary information that Rank Workflow extracts from a review is stored into a review object objReview 122 and comprises:

- reviewer name is a pointer to an entry in objIdTable 100,
- role is stored in review 46 by name, and is identified in the structure as a pointer to the appropriate objRole 114,
- status stores the status of review 46. Only Finalized reviews are further processed. In Preparation reviews count only in an escalation schema (d__ir parameter).
- relevant is used internally by Rank Workflow to mark the relevant reviews. The designer can instruct Rank Workflow, for example, to ignore all but the latest review 46 of a reviewer for a given role 48 (LATEST),
- grade stores the grade assigned by reviewer for the corresponding aspect of document 44. Can be a NULL value.
- date stores the date when the review was last updated, if not finalized, or the date when review 46 was finalized.

5.8. Operation of Workflow Manager

FIGS. 9A through 9I present the pseudo code that describes the operation of workflow manager 30. The entry point is procedure FinalizeDoc (FIG. 9A). When procedure FinalizeDoc is executed, the internal representation of workflow graph 52 is built, and the summary information for each associated review 46 is stored into objReview 122 (FIG. 8).

In presenting the pseudo code, the following symbols are used:

//introduces a comment, $\emptyset$ denotes the empty set or list, $\exists$ and $\epsilon$ are the existential and membership operators, respectively, $\cap$ and $\cup$ are the set intersection and set union operators, respectively, $=$ and $\leftarrow$ are the equality and assignment operators, respectively.

Also, constructs like $role$__cnt are notations for the __cnt data component (in this case) of the current role.

Referring to FIG. 9A, workflow manager 30 performs the following steps while processing document 44, 1. reads the current stage set (field crt__stage) and current grade (field dc__grd) from document 44 (lines a01 and a02). When the preparer submits document 44 for review, the user interface logic initializes field crt__stage with the appropriate value for each workflow graph 52. For the example workflow graph 52 in FIG. 4, the initial value for crt__stage is {s1 }. While in review, field crt__stage in document 44 contains sets (lists) of stages, for example, {s2, s3, s4}. Document 44 is usually processed by workflow manager 30 many times before it is finalized. Intermediate values for stage and grade are stored from a run to the next into document 44, 2. initializes variables doc__has__changed, stop__de, and cc__roles (lines a03 through a06). Variable doc__has__changed keeps track of whether or not any information in document 44 has changed, in order to save the changes back to mass storage only if necessary. Variable stop__dc is set to TRUE during processing of document 44 if document 44 is finalized, either normally or through a stop condition. Variable cc__roles stores a pointer to a list of objRoleCells 118 (FIG. 8) and accumulates the cc roles that are to be notified at the end of the current rim of workflow manager 30 for document 44. Set (list) cc__roles is augmented in procedure FinalizeStage (line a18) and then used to IdentifyCcNotifs (lines a28 and a37), 3. tests if the evaluation process can be stopped asynchronously (lines a06 through a13). This feature is useful if the business process allows reviewers to change their minds and stop the evaluation of document 44 after their role has been finalized, or before their role has been notified. If there is a review stop condition defined for workflow graph 52 then it is evaluated against all reviews 46 (line a08). If any such evaluation results in TRUE then variable stop__dc flags the condition (line al 0). Furthermore, if a review transfer on stop action is defined, it is executed for each review 46 which satisfies the stop condition (line a09), 4. tries to finalize all stages listed in crt__stage__set (lines a14 through a23). To eliminate the influence of the order in which stages are listed in crt__stage__set, and to finalize all stages that can be finalized, not only those listed initially in crt__stage__set but their descendants as well, a "repeat . . . until no more changes" schema is used. Each time the loop is executed, a new value is computed for crt__stage__set as follows:

4.1 stage set (list) nxt__stage__set is initialized as the empty set (line a16), 4.2 for each stage in crt__stage__set procedure FinalizeStage computes the immediate descendants of stage in nxt__stages (line a18); they are added to nxt__stage__set at line a19, 4.3 crt__stage__set is replaced by nxt__stage__set (line a21), When control exits the loop, crt__stage__set contains all stages that could not be finalized, 5. variable stop__dc is set to TRUE if any of the following conditions are met, 5.1 workflow graph 52 defines a document stop condition, and the result of evaluating this condition is TRUE (line a24), 5.2 crt__stage__set contains no stages, i.e., the evaluation of document 44 ended successfully (line a25), 6. if the evaluation of document 44 is not completed then the to and cc recipients are identified (lines a27 and a28), and notifications are sent out (line a29); the list of stages that are not finalized (crt__stage__set) is stored back to document 44 (field crt__stage, line a32); if there is a post finalize formula defined for document then it is evaluated (line a41); finally, document 44 is saved back to disk (line a42), 7. if the evaluation of document 44 is completed then the current stage set is stored in document 44 (line a32); the status of document 44 is changed to FINALIZED (line a34); document notifications are sent to the appropriate recipients (specified in document notification template) at line a38; if the evaluation of document 44 was not stopped then the eventual cc reviewers are identified and notified (lines a36 through a39); if there is a post finalize formula defined for document then it is executed (line a41); finally, document 44 is saved back to disk (line a42).

Referring to FIG. 9B, procedure FinalizeStage receives input parameters crt__stage__set—the set of stages that have not been finalized yet, stage—the current stage to be finalized, and produces output parameter nxt_stages—the immediate successors of stage if stage can be finalized, and stage if not. could_fin_st is a Boolean variable that is passed from a loop run to the next and specifies if at least one stage in the current crt_stage_set could be finalized. cc_roles accumulates the list of cc roles that must be notified at the end of processing of document 44. Procedure FinalizeStage comprises the following steps, 1. initialize the grade associated to stage as a NULL value and extract all Roles incident in stage from workflow graph description 52 (lines b01 and b02),
2. if there are no incident roles into stage (like for stage s1 in workflow graph 52 in FIG. 4) then stage can be finalized (line b03); otherwise
3. procedure FinalizeAllRoles attempts to finalize all Roles (line b04); it returns the current grade of stage into st_grd, the total number of Roles with at least one listed reviewer in r1_cnt, and the number of finalized roles in r1_f_cnt,
4. if none of the Roles can be finalized then the status of stage is ACTIVATED, otherwise it is INCOMPLETE (lines b05 through b07),
5. test if the evaluation of document 44 can be interrupted (lines b08 through b15). If there is a stage stop condition associated to stage in workflow graph 52 and its evaluation produces TRUE then the event is flagged in stop_dc (line b09). Further, if there is a transfer action associated to stage in workflow graph 52 then it is executed from all reviews 46 to document 44, where reviews 46 have been composed for a role in Roles and have been marked relevant in FinalizeAllRoles (lines b11 through b13).
6. a stage cannot be finalized unless all ancestor stages are also finalized. In the example workflow graph 52 in FIG. 4, assuming that the strategy reviewer has finalized her review and there is no final reviewer for a specific document 44, without this condition document 44 would be finalized, even if the copyright reviewers did not compose a review 46 for document 44. Hence, if any of the ancestors of stage are in the current stage set crt_stage_set then stage cannot be finalized (line b16).
7. stage is finalized if the number to finalize condition for stage is satisfied, or if workflow graph 52 defines a finalize condition for stage and the result of its evaluation is TRUE (line b17),
8. if stage could not be finalized then nxt_stage is stage and could_fin_st remains unchanged (lines b18 and b19),
9. if stage could be finalized then the following steps are performed:
    9.1. the role and stage transfers from relevant review 46 are performed (TransferOnFinalize, line b21),
    9.2. if there is a post finalize action defined in workflow graph 52 for stage then it is executed (line b22),
    9.3. the document grade is computed at line b23 using the document grade formula from the existing value of document grade and the stage grade (which was computed in FinalizeAllRoles at line b04),
    9.4. the status of document 44 is updated to INCOMPLETE and the partial grade for document 44 is stored in document 44 (line b24),
    9.5. the status of stage is updated to FINALIZED (line b25),
    9.6. for all outgoing roles from stage that have associated reviewers, the_cnt data component is set to 0 (lines b26 through b30),
    9.7. the cc_roles list is augmented with the cc roles associated to stage in workflow graph 52 (line b31),
    9.8. the nxt_stages variable stores the immediate successors of stage (line b32), and
    9.9. could_fin_st is set to TRUE (line b33).

Referring to FIG. 9C (procedure TransferOnFinalize), whenever a stage is finalized, the role and stage transfers are executed from the appropriate reviews 46 into document 44 (lines c05 and c06). The appropriate reviews 46 are finalized reviews, marked relevant, and composed for roles that are incoming into stage (line c04). The status of all incoming and finalized roles is updated to FINALIZED (line c09). If there is a post evaluation formula defined in workflow graph 52 for role, incoming into stage, it is evaluated in the context of document 44 (line c10).

Referring to FIG. 9D, FinalizeAllRoles takes as input parameters the list of Roles that are incident in a stage, and a partial value for the stage grade, st_grd. FinalizeAllRoles returns the number of roles in Roles assigned at least one reviewer (r1_cnt), the number of finalized roles in Roles (r1_f_cnt), and the updated value of st_grd, the stage grade. The Reviewers associated to a role in Roles are read from document 44 at line d04. r1_cnt is initialized to 0 (line d01) and is incremented if there are reviewers assigned to a role in Roles (line d06). r1_f_cnt is initialized to 0 (line d01) and is incremented for each role in Roles that could be finalized by FinalizeRole (line d09). In this latter case, the stage grade is computed using the formula for the stage grade, the partial stage grade and the current role grade returned by FinalizeRole (line d10). The fact that role could be finalized is marked into the fin field of objRole at line d11.

Referring to FIG. 9E, procedure FinalizeRole takes as input parameters the role that is attempted to be finalized, and the list of reviewers authorized to review role. It returns the grade associated to role (r1_grd), and a Boolean that specifies whether or not role could be finalized. Procedure FinalizeRole comprises the following steps:

1. initialize the grade associated to role to a NULL value (line e01); initialize two counters that specify how many reviewers composed reviews 46 for document 44 (rv_cnt) and how many of these reviews are finalized (rv_f_cnt) (line e02),
2. for all reviewers R in list Reviewers the reviewer counter is incremented (line e05); if reviewer R has finalized at least one review for role then the finalized reviewer counter is incremented (line e07), and the grade for the role is computed using the grade formula defined in workflow graph 52, the current role grade, and the review grade computed from all reviews 46 composed by reviewer R for role (line e08),
3. if the number of finalized reviews is strictly greater than 0 then the status of role is updated to INCOMPLETE and the role grade is saved into document 44 (line e11),
4. if there is a stop condition defined in workflow graph 52 for role and it evaluates to TRUE (line e12) then variable stop_dc is set to TRUE to specify that the document evaluation must be interrupted (line e13). In addition, for all relevant reviews composed by an authorized reviewer for role, if there is a transfer on stop condition defined for role in workflow graph 52 then it is executed from review 46 to document 44 (lines e15 through e19),
5. if the number to finalize condition for role is satisfied or there is a finalize condition associated to role in workflow graph 52 which evaluates to TRUE, then the return value could_fin_r1 is set to TRUE and the status of role is updated to TENTATIVE (lines e22 through e25).

Regular review notifications are identified by evaluating the template formula for each role that is to be notified. The individuals to be notified are identified from the authorized reviewers explicitly listed in each document 44 for a specific role. Reviewers who finalized at least one review for document 44 for a given role 48 are not notified (again). Reviewers who composed a review 46 for document 44 for a given role 48, but did not finalize it are notified if, in addition to other conditions, the time interval from the time they created the review is larger than the In Review Interval (FIG. 7F), which is stored into field d_ir in objTemplate (FIG. 8).

Referring to FIG. 9A, IdentifyToNotifs and IdentifyCcNotifs (lines a27, a28, and a37) identify the notification templates to be used and build the list of reviewers to be notified and cc'd respectively, in fields c_to and c_cc of objTemplate 106 (FIG. 8). Referring again to FIG. 9A, the actual notifications are sent at lines a29 and a38. The notification template table is traversed and notifications are built and sent using all objTemplates 106 that have non-empty lists in either the c_to or c_cc fields.

Referring to FIG. 9G, IdentifyToNotifs fills in the c_to fields of objTemplates 106 starting from the list of stages that could not be finalized, crt_stage_set. For each stage in crt_stage_set workflow manager 30 computes a list of roles for which reviews are needed (line g02). If there are non finalized roles that have a non NULL value in the_cnt component (function NotifRecipients, FIG. 9F) then for all non finalized roles the following steps are executed (FIG. 9G), 1. an objTemplate 106 to use is identified from workflow graph 52 (line g06),
2. if no template is specified, or the list of reviewers associated to the role is empty then nothing happens. Otherwise, if there is a non NULL_cnt component (_cnt=0 if a notification is going to be sent for the first time;_cnt>0 is the number of notifications sent so far), and if the number of sent notifications does not exceed the specified limit, then the actual reviewers are selected from Reviewers by procedure ComputeToReviewers at line g11, which performs the following steps (FIG. 9H):
   2.1 if reviewer R from Reviewers has composed and finalized a review 46 for role, then R is not notified (line h03), otherwise
   2.2 if reviewer R has not been notified yet (role_cnt=0) then R is notified if he has not composed a review already (lines h04 and h05), otherwise
   2.3 if the interval from the previous notification does not exceed the d_na limit defined for the chosen template then R is not notified (line h07), otherwise
   2.4 if there is an In Preparation review for role by R and the interval from the date the review was composed does not exceed the d_ir limit defined for the chosen template, then R is not notified (line h08), otherwise
   2.5 reviewer R is added to list c_to in template tplt; the status of role is updated to NOTIFIED and variable doc_has_changed is set to TRUE (lines h10, h11, h15, and h16).

Referring to FIG. 9I, procedure IdentifyCcNotifs performs the following steps for all roles in input parameter cc_roles:

1. identifies the template to be used as tplt (line i02),
2. if no template is specified or if the list of reviewers associated to current role is empty then no action is taken (line i04), otherwise
3. the status of role is updated to CARBONCOPIED (line i05), and
4. the c_cc list of template tplt is appended the list of reviewers associated to the cc role (line i06).

Procedure UpdateStatus updates the status of a role, stage, and document; and updates the value of the grade for role, stage, and document if applicable.

Procedures in_review_exists(Reviewer, Role) and finalized_exists(Reviewer, Role) traverse the Review table and establish if there is a review from Reviewer for Role, which is In Review or Finalized, respectively.

These are the main procedures that implement the part of workflow manager 30 called the workflow engine. Other procedures, such as those used to manipulate lists and sets (for example, set union, set intersection, list_copy, cell_copy) are standard procedures, well known to persons of ordinary skill in the art. The procedure that implements the actual notification mailing (SendNotif) depends on the underlying mail system and can easily be implemented by persons of skill in the art and the respective mail systems.

5.9. Example: A Project Proposal Application

The method of this invention is adaptable for implementing various types and categories of applications. Within the class of feed-forward workflows, the synchronization primitives defined by the workflow graph construct allow the implementation of any synchronization schema. By choosing different settings and writing different code fragments for the available functional properties, an application designer instructs workflow manager 30 to further refine the evaluation schema. A few of the capabilities of this method are exemplified below.

The application described next automates the approval/rejection process for project proposals in a software company. Two solutions are presented. The first one implements a static workflow and has a minimal set of requirements. The set of reviewers is computed for each proposal when it is submitted, and the only result of the review is a pass/fail collective verdict. In the second solution, some reviewers do not have the authority to reject a proposal but they can argue why the proposal should be approved or rejected. Their comments are passed to higher ranking reviewers who can approve or reject a proposal; earlier reviewers also can dynamically modify the workflow by engaging the higher ranking reviewers who otherwise would not be involved in the review process.

The preparer is the project proponent and is in charge with preparing, submitting, and monitoring the status of a project proposal. Only two parameters entered by the preparer in the document have a direct impact on the work flow, the work volume and the average cost. The rest of the information is used only by reviewers to make a decision.

5.9.1. A Minimal Static Workflow

Business Rules

The business rules have been identified by the system analyst and require that any project proposal go through an approval process, outlined by workflow graph 52 presented in FIG. 4.

The proposal goes first to the software, platform, pricing, and competitors reviewers in parallel, who review it from their respective points of view and approve or reject it.

Only after both the software and platform reviews have been favorable, a notification is sent (in parallel) to the feasibility and copyright reviewers. Similarly, only after the pricing and competitors reviewers have approved the proposal, a notification is sent to the marketability reviewer. The software, platform, pricing, and competitors reviewers focus in their review on the proposal details, while the feasibility and marketability reviewers act like final technical and marketing reviewers respectively.

After both the feasibility and marketability reviewers approve the proposal, a notification is sent in parallel to the funds and staff reviewers, provided that the preparer's work volume estimate is greater than 4 man months.

When both the staff (if appropriate) and funds reviewers have approved the proposal, a notification is sent to the strategy reviewers. If in addition, the copyright reviewer has approved the proposal and the preparer's average cost estimate is greater than $100K then a final approver is also notified.

Finally, the proposal is approved when both the final approver (if applicable) and the strategist approve.

There are multiple reviewers for each of the aforementioned roles and all of them are notified, but only one review is sufficient to finalize a role.

If at any time when it is a reviewer's turn to evaluate a proposal he/she composes a rejection, then the proposal itself is rejected. The preparer can choose to modify the proposal and resubmit it as a revision. The new proposal will go through the same approval process like the original one.

Whenever the pricing, the feasibility, the strategy and the final reviewers get a notification, an observer gets a copy (is cc'd), but does not have the authority to take an action.

Implementation

Two forms are used in the application, Project Proposal and Review. The first one is used to compose a proposal and define the reviewers while the second is used to store the reviewer's decision.

The business rules specified above allow the Project Proposal form logic to compute the list of reviewers when all the relevant information has been filled in. The form contains fields of type text list with the same name as the roles in the workflow schema. The actual reviewer names can be hard coded in the formulae or stored in a separate database and looked up when needed.

Three notification templates are used. tpltApproval is used to notify the preparer that the proposal has been approved while tpltRejection is used to notify the same that the proposal has been rejected. tpltNotification is common for all roles and is used to inform the reviewers that the document is ready for their review.

For all these templates the No Action Interval and In Review Interval are 0 since the notifications are sent only once. No escalation schema has been implemented for this minimal version.

Both the Approval and the Rejection notifications are sent to the preparer and originate from the administrator. The subject line clearly identifies the document and its status. The body of each notification displays information from the proposal itself. If the proposal is rejected the justification entered by reviewer(s) is also displayed in the Rejection notification. Notification is sent on behalf of the preparer and the administrator is cc'd on each.

The transfer of the rejection justification from review 46 to document 44 is achieved via the trsfRejectionJustification transfer action, discussed previously.

The functional properties of the workflow objects are specified below. The grading system is Boolean, with 1 standing for approve and 0 standing for reject. The unspecified components are disabled.

- the review grade formula is MIN; whenever a reviewer composes a rejection and an approval, the rejection takes precedence,
- the role number to finalize is ONE; one review is sufficient to finalize a role,
- the role stop condition is, the role grade equals 0; whenever the role is rejected, the evaluation of document 44 is stopped,
- the role transfer on stop action is trsfRejectionJustification,
- the role grade formula is MIN; whenever one reviewer approves and another rejects, the rejection takes precedence,
- the role template field contains the template name tpltNotification,
- the stage grade formula is MIN; whenever an incoming role is rejected and another incoming role is approved, the rejection takes precedence,
- the stage number to finalize is ALL; all incoming roles must be finalized in order to send notifications to the outgoing roles,
- the document grade formula is MIN; whenever one stage is approved and another stage is rejected, the rejection takes precedence,
- the document template contains a formula which selects tpltRejection or tpltApproval based on dc_grd.

Variation on the Theme

The above solution considers a rejection from a person only when the system expects a review from that person. For example, if the strategy reviewer has not been notified yet, but rejects, his rejection will not be taken into account until it is his turn to review the proposal. The staff and funds reviewers would still be notified in this case and will have to review the proposal. Or, if a software and a platform reviewer have approved and a notification has been sent to the feasibility reviewer, then a subsequent rejection from the same or a different software reviewer will not count.

In order to take asynchronous rejections into consideration the role stop condition and transfer on stop action are disabled, and the review stop condition and transfer on stop action are enabled. The contents for the review stop condition is, the review grade equals 0, and the review transfer on stop action consists of trsfRejectionJustification.

5.9.2. A Dynamic Workflow

The software, platform, pricing, and competitors reviewers individually do not have the authority to reject a proposal. Instead, they can conclude that the information provided by the preparer is insufficient for a proper review. The system automatically rejects a proposal when all software, or all platform, or all pricing, or all competitors reviewers agree that the information provided by the preparer is insufficient. If at least one such reviewer admits that the data is sufficient and finalizes a review, then the respective role is finalized and notifications are sent to the next reviewers.

Each of the software, platform, pricing, or competitors reviewers has the ability to comment on the proposal. Their comments are transferred from review 46 to document 44 formatted as to include the name of the person and the role he/she plays.

In addition, the software reviewer is required to estimate the work volume needed to complete the project. His estimate, rather than preparer's, is subsequently used to determine whether or not the staff reviewer should be involved in the review process (the condition is, reviewer's estimate is greater than 4 man months).

Both the pricing and competitors reviewers have the ability to explicitly request that the marketability reviewer be also involved in the review process. In addition, the pricing reviewer is required to estimate the average monthly cost for one person with the appropriate skills needed to work on the project. Her estimate, rather than preparer's, is used in subsequent computations to determine if the funds and final reviewers are also involved in the review process.

The feasibility reviewer is a final approver for the technical part of the project and has the authority to reject a proposal. Similarly, if engaged by either the pricing or competitors reviewer, the marketability reviewer has the authority to reject the proposal. If he rejects then he is required to enter a justification, which will appear in the document itself and be pan of the rejection notification sent to the preparer. Neither the feasibility nor the marketability reviewers are required to comment on the proposal.

The copyright reviewer reviews all proposals but does not have the authority to reject one. Instead, she can engage the final reviewer in the process and, if she does, she is required to comment on why the proposal should be approved or rejected.

There are two staff reviewers who are required to review a proposal if the software reviewer's estimate for the work volume is greater than 4 man months. A staff reviewer does not have the authority to reject a proposal but can request that the final reviewer is also involved. His comments are transferred from review 46 to document 44 and may be taken into account by the final reviewer. If both staff reviewers respond, only the earliest response is considered.

A funds reviewer is required to evaluate and comment on a proposal if the reviewer estimated cost exceeds $100K (the software reviewer estimates the work volume and the pricing reviewer estimates the average cost per volume unit). A funds reviewer does not have the authority to reject a proposal.

If the reviewer estimate for the cost exceeds $100K then the final reviewer must review the proposal. If the condition is not met, the final reviewer must still review if the copyright reviewer considers it necessary. The strategy reviewer must review a proposal if the feasibility reviewer deems it necessary. If the final or strategy reviewers reject, they have also to supply a reason.

Implementation

Like in the case of the static workflow, the grading system is Boolean; however, for the feasibility, marketability, final, and strategy reviews 0/1 stand for reject/approve, while for the software, platform, pricing, and competitors reviews 0/1 stand for insufficient/sufficient information. Since the copyright, staff, and funds reviewers are not allowed to reject a proposal, there is no grade associated to their review.

The handling of the "insufficient" reviews is accomplished using the following combination of functional properties:

for the software, platform, pricing, and competitors roles, the number to finalize condition is ALL, for the software, platform, pricing, and competitors roles, the grade formula is MAX, for the software, platform, pricing, and competitors roles, the condition to finalize is, the role grade equals 1, for all stages, number to finalize is ALL, for all stages, grade formula is MIN, for stages s2 and s3, the stop condition is, stage grade equals 0.

If there is a "sufficient" review for one of the aforementioned roles, the role condition to finalize is satisfied and the stage stop condition is not; as a result the role is finalized.

If the only review for one of the aforementioned roles is an "insufficient" review then the role grade is 0 and the role is not finalized. If, however, all reviews are "insufficient" reviews then the role grade is still 0, but the role is finalized because of the number to finalize criterion. The grade of the associated stage is 0 and the stop condition for the stage is satisfied. Consequently, the document evaluation is stopped.

Reviewers are required to supply different information in their reviews depending on their roles, and consequently they have to use different forms. Reviewers are reminded of which form to use each time they are notified. Each role is thus associated its own notification template. Like in the previous case, there are two notification templates associated to the document, tpltApproval and tpltRejection. Workflow manager 30 decides which notification to send out when document 44 is finalized based on the final grade dc_grd.

For all the roles except software, platform, pricing, and competitors the number to finalize is ONE—only one review is necessary to finalize any of the other roles.

For all the roles except software, platform, pricing, competitors, and staff, the grade formula is MIN—if a rejection and an approval exists, the rejection takes precedence. The grade formula for role staff is EARLIEST.

The transfer actions are, trsfComments—transfers the comments from review 46 to document 44 and includes the name of the reviewer and the role, trsfEngageMarketability, trsfEngageStaff, trsfEngageFinal, trsfEngageStrategy—if a reviewer explicitly requests that a marketability, staff, final, or strategy reviewer be required to review a document then these transfer actions fill in the appropriate role fields in document 44 with the appropriate person names, trsfMonthlyCost—transfers the reviewer's estimate for the monthly cost from review 46 to document 44, trsfWorkVolume—transfers the reviewer's estimate for the work volume from review 46 to document 44, trsfRejectJustification—transfers the rejection justification from review 46 to document 44, trsfInsufDetails—sets a flag in document 44 which indicates that all reviewers associated to a role could not find sufficient details to make a decision.

The transfer on finalize actions consist of, for role competitors, trsfComments, trsfEngageMarketability, for role copyright, trsfComments, trsfEngageFinal, for role feasibility, trsfEngageStrategy, for role funds, trsfComments, for role marketability, none, for role platform, trsfComments, for role pricing, trsfComments, trsfEngageMarketability, trsfMonthlyCost, for role software, trsfComments, trsfEngageStaff, trsfWorkVolume, for role staff, trsfComments, trsfEngageFinal.

For the roles that have the authority to reject a proposal, feasibility, marketability, final, and strategy, the stop condition is, role grade equals 0, the transfer on stop action is trsfRejectJustification.

For stages s2 and s3 the stop condition is, stage grade equals 0 (stage grade is the minimum of the two grades of the incoming roles; if any of these roles is rejected then the evaluation is stopped). For these stages the transfer on finalize action is trsfInsufDetails.

Finally, when stage s4 is being finalized, it is guaranteed that the reviewer estimates for work volume and average cost are available (they are supplied by the software and pricing reviewers respectively). At this time the decision is made on whether or not the final reviewer is engaged. The post finalize formula for stage s4 contains the logic to engage the final reviewer if work volume times average cost is greater than $100K.

6. SUMMARY, RAMIFICATIONS, AND SCOPE

Thus the reader will see that the method of this invention can be used to implement a wide class of document evaluation applications which minimize the overall review time, by taking advantage of the inherent parallelism within the business process.

The work flow graph is a versatile structure which allows an application developer to expose parallelism and define the synchronization patterns which mirror the data dependencies within the business process.

The functional properties associated to each of the workflow objects add flexibility to the method by allowing the developer to define rules for aggregating a more objective evaluation of an aspect from subjective reviews of a plurality of reviewers (opinion poll), weighing the available reviews differently depending on the reviewer, the reviewed aspect, and the relative moment when the review is produced, allowing reviewers to contribute and build a review case for each document, defining rules for selecting the relevant reviews when more are available, dynamically modifying the evaluation strategy for each individual document responsive to reviewers' actions, computing the reviewer list associated to each role just before notifications are sent out in order to identify the most up to date recipients, allowing to specify various exception conditions at various moments in the review process, providing reviewers with individualized instructions on which aspects need to be reviewed by each of them, allowing a developer to define various escalation strategies in case reviewers do not respond within a predefined time interval (including backup reviewers).

While the above description contains many specificities, these should not be construed as limitations on the scope of the invention, but rather as an exemplification of one preferred embodiment thereof. Many other variations are possible. For example, The role status can include an In Preparation value to identify the situation when there are only In Preparation reviews for a role.

Workflow manager 30 in the current embodiment is scheduled for execution periodically by means of an external scheduler. Alternately, workflow manager 30 could be dormant in the system and awakened by the occurrence of some events, such as the presence of a newly submitted document 44, of a new review 46, or a change in the status of an existing review 46.

In the current embodiment, workflow graph description 40 is represented by a collection of records in the underlying database system taking advantage of the remote access facilities provided by such system. Workflow graph 52 can alternatively be described using a description language and its description can be stored in a file on server computer 24.

The data structures used internally by workflow manager 30 and the associated pseudo code are disclosed herein as significant elements for implementing the present invention. It will be appreciated by those skilled in the art that other methodologies, data structures, and variations in pseudo code can be used to implement a system according to the invention. For example, objIdTable 100 (see FIG. 8) can be implemented using a one dimensional array of characters and the associated access methods can be suited to the alternate structure.

Currently, due to the characteristics of the communication lines, the performance of a database access depends on the proximity between the database and its user. In order to improve performance, a system using the current invention can be architectured as a distributed system (see FIGS. 10A and 10B). Copies of documents/reviews database 38 can reside at conveniently chosen locations. Modifications occurred at one site are replicated to the other sites through a process called replication. As illustrated in FIG. 10A, copies of workflow manager 30 can run at all sites where replica copies of documents/reviews database 38 exist. In this case, the workflow description 40 can also be replicated to all sites. In order for a reviewer not to receive multiple notifications for the same document from multiple workflow managers 30, a mechanism to distribute the work between all workflow managers 30 can be implemented. Another solution is presented in FIG. 10B. Although there are multiple copies of documents/reviews database 38, workflow manager 30 runs only at one site doing all the work on one server computer 24. The generated changes are replicated to all sites through replication.

Lotus Notes was chosen as the platform of implementation for the current embodiment because it incorporates in one product a database system, an electronic mail system, and a language interpreter which can be invoked programmatically. Alternative embodiments of the method of this invention can make use of other underlying database systems, including a relational one, other electronic mail systems, and other languages/language interpreters.

In the underlying database system, data can be organized in a variety of ways. For example, document instances can be stored in a document table and role instances can be stored in a role table. The list of roles associated to a document is in fact an instance of a one-to-many relationship between documents and roles and can be implemented by means of another table. Similar relationships exist between other objects in the system and can be implemented in a similar manner. Those skilled in the art will understand that there are numerous other ways to implement these relationships. The user interface in a relational system can display related information that resides in different logical records on the same screen, just like in the Lotus Notes implementation of the current embodiment. Other presentation layouts can also be used. Examples of relational database systems are Microsoft SQL Server™, Sybase System 10, or Oracle.

Depending on the capabilities of the underlying electronic mail system, the notifications can incorporate, besides the text of the notification, font, color, and size information. Also, the notifications can incorporate hypertext links. In this respect, Rank Workflow supports Lotus Notes doelinks which when clicked open and display the document to be reviewed. Examples of alternative electronic mail systems are Lotus cc:Mail™, Microsoft Mail, and Microsoft Exchange.

The programming language can be any language that allows programmatic access to the elements of the database, such as Microsoft Visual Basic®, Lotus Script, or other languages specifically designed for a particular platform. Those skilled in the art will appreciate that the more features the programming language includes, the more flexible the embodiment will be.

In the current embodiment, the transfer action makes use of features available in the underlying programming language. Alternatively, the transfer action can be embedded in the programming language itself, for example, by incorporating constructs that identify the source and destination documents.

In the current definition of the method, the grade formula packages both the functionality to select relevant reviews from the set of available reviews (EARLIEST, LATEST, ALL), and the functionality to compute an aggregate grade from components grades (MIN, MAX, SUM, AVG, etc.). The transfer actions are defined only from the relevant reviews 46 to document 44. Alternately, the two functions can be separated to allow independent computation of grades and transfer of data from reviews 46 to documents 44.

Workflow manager 30 can be viewed as a document processor which processes a document 44 independently from all other documents in the database. In order to relate the processed documents, for example, to assign unique identifiers (sequential numbers) to documents, or to count the number of processed documents, or to assign reviewers from a pool in a round robin fashion, workflow manager 30 uses global variables. These global variables are maintained while processing each document 44, and from a run of workflow manager 30 to the next. To keep the global variables permanent, Rank Workflow stores them in a special Lotus Notes document and manipulates them via a set of transfer actions customized for each application by the designer. Those skilled in the art will understand that the same mechanism can be used for other platforms.

While a particular set of functional properties, such as condition to stop, template formula, etc., is disclosed herein for workflow objects, it can be appreciated that additional functional properties can be defined.

For example, the method of this invention is applicable for feed-forward workflow graphs 52. Minor problems with document 44 may result in the interruption of the evaluation process. The preparer could fix the problems and submit a revised document. However, the revision may go through the same review process as the original document and may require reviews for aspects that have not changed and have already been reviewed. Alternatively, only reviews for the aspects that have indeed been affected by the fix can be sought, by defining for each role and/or stage a functional property which specifies the earliest stage that is not affected by a stop event and its associated undo action.

A system incorporating the method of this invention may include an application builder component. Based on a graphical description of workflow graph 52, similar to those in FIGS. 4 and 6A through 6D, the application builder component may generate an external representation of workflow graph, or even an intermediate representation, easily loadable by workflow manager 30. Furthermore, based on a library of templates, the application builder component may even generate complete applications which require very little customization.

The method of this invention may also use electronic telecommunications apparata in certain embodiments for carrying out the method in specific hardware environments. For example, reviewers can be paged in lieu or in addition to a regular notification; or notifications can be delivered via voice mail using voice synthesis devices and evaluations can be accepted via alternative input devices, such as voice recognition systems.

It should be understood that the above description of this invention and the examples of embodiments of systems that practice the method of this invention are given to illustrate the principles of the invention and not to delimit its scope. It will be readily apparent to persons of skill in the art that numerous variations could be introduced into the specific embodiment described without departing from the scope of the invention as set forth in the following claims.

I claim:

1. A computer implemented method for structuring the evaluation of at least one document by a plurality of reviewers who participate in and contribute to said evaluation, said at least one document prepared by at least one preparer, said method comprising the steps of:

(a) defining a workflow graph structure which specifies said evaluation, and storing it into a memory, said workflow graph structure comprising a generic review, a plurality of roles, a plurality of stages, a generic document, a criterion to finalize the role for each of said plurality of roles, a criterion to finalize the stage for each of said plurality of stages, and a criterion to finalize the document for said generic document;

(b) creating said at least one document having a plurality of aspects to be reviewed independently, each of said plurality of aspects corresponding to one of said plurality of roles;

(c) associating zero or more authorized reviewers to said at least one document and to each of said plurality of roles;

(d) creating at least one review for said at least one document associated to at least one of said plurality of roles;

(e) analyzing said at least one document and said at least one review relative to said workflow graph structure, processing a subset of said plurality of roles and a subset of said plurality of stages responsive to the actions of said plurality of reviewers, consistent with said criteria to finalize the role associated to said subset of said plurality of roles, said criteria to finalize the stage associated to said subset of said plurality of stages, and said criterion to finalize the document;

(f) notifying said authorized reviewers associated to said plurality of roles outgoing from each of the processed stages when its associated said criterion to finalize the stage is satisfied.

2. The method of claim 1, wherein each of said criterion to finalize the role, each of said criterion to finalize the stage, and said criterion to finalize the document is a number to finalize criterion.

3. The method of claim 2, wherein each of said number to finalize criterion is selected from the group consisting of: ONE, ALL, and percentage.

4. The method of claim 1, wherein each of said criterion to finalize the role, each of said criterion to finalize the stage, and said criterion to finalize the document is a condition to finalize criterion.

5. The method of claim 1, further comprising the steps of:

(a) further refining said workflow graph structure by including a role transfer on finalize action for each of said plurality of roles, and a stage transfer on finalize action for each of said plurality of stages;

(b) from said at least one review for one of said plurality of roles to said at least one document, transferring information according to corresponding said role transfer on finalize action upon satisfying said criterion to finalize the role for said one of said plurality of roles;

(c) from said at least one review for one of said plurality of roles incoming into one of said plurality of stages to said at least one document, transferring information according to corresponding said stage transfer on finalize action upon satisfying said criterion to finalize the stage for said one of said plurality of stages.

6. The method of claim 1, further refining said workflow graph structure by:

(a) for each of said at least one review associated to one of said plurality of roles, ranking the aspect corresponding to said one of said plurality of roles using a grade and a weight;

(b) for each of said plurality of roles, defining a role grade formula to be applied to said grade and said weight of said at least one review associated to said each of said plurality of roles;

(c) for each of said plurality of stages, defining a stage grade formula to be applied to said grade and said weight of said plurality of roles incoming into said each of said plurality of stages;

(d) for said generic document, defining a document grade formula to be applied to said grade and said weight of all said plurality of stages.

7. The method of claim 6, wherein each of said role grade formula, each of said stage grade formula, and said document grade formula is selected from the group consisting of: MAX, MIN, SUM, AVG, CNT, WSUM, WAVG, EARLIEST, and LATEST.

8. The method of claim 1, further comprising the steps of:

(a) further refining said workflow graph structure by defining a plurality of stop conditions, comprising:

(i) for said generic review, a review stop condition to be evaluated upon processing of the associated said at least one document;

(ii) for each of said plurality of roles, a role stop condition to be evaluated upon processing of said each of said plurality of roles;

(iii) for each of said plurality of stages, a stage stop condition to be evaluated upon processing of said each of said plurality of stages;

(iv) for said generic document, a document stop condition to be evaluated upon processing of said at least one document;

(b) stopping said document evaluation upon satisfying any of said plurality of stop conditions.

9. The method of claim 8, further comprising the steps of:

(a) further refining said work flow graph structure by including a review transfer on stop action for said generic review, a role transfer on stop action for each of said plurality of roles, and a stage transfer on stop action for each of said plurality of stages;

(b) from said at least one review to said at least one document, transferring information according to said review transfer on stop action upon satisfying said review stop condition for said at least one review;

(c) from said at least one review for one of said plurality of roles to said at least one document, transferring information according to corresponding said role transfer on stop action upon satisfying said role stop condition for said one of said plurality of roles;

(d) from said at least one review for one of said plurality of roles incoming into one of said plurality of stages to said at least one document, transferring information according to corresponding said role transfer on stop action upon satisfying said stage stop condition for said one of said plurality of stages.

10. The method of claim 1, wherein said notifying step comprises the steps of:

(a) specifying at least one notification template;

(b) identifying one of said at least one notification template to be used in notifying step via a template formula.

11. An apparatus for managing the participatory evaluation of at least one document by a plurality of reviewers, said participatory evaluation described by a workflow graph structure, the apparatus comprising:

(a) a graph description interface module for specifying said workflow graph structure using an external representation, said workflow graph structure comprising a generic review, a plurality of roles, a plurality of stages, a generic document, a criterion to finalize the role for each of said plurality of roles, a criterion to finalize the stage for each of said plurality of stages, and a criterion to finalize the document for said generic document;

(b) a preparer interface module for allowing a plurality of preparers to create, store, retrieve, and modify said at least one document, having a plurality of aspects to be reviewed, each of said plurality of roles corresponding to one of said plurality of aspects;

(c) an identifying procedure used to associate zero or more authorized reviewers to said at least one document and to each of said plurality of roles, thereby allowing said authorized reviewers to review the aspects corresponding to said each of said plurality of roles;

(d) a reviewer interface module used by said authorized reviewers to create, store, retrieve, and modify a plurality of reviews for said at least one document and said plurality of roles;

(e) a translation module for generating an internal representation of said workflow graph structure from said external representation, and storing it in a memory;

(f) a workflow manager accessing said at least one document, said plurality of reviews, said internal representation; analyzing and updating said at least one document based on its associated said plurality of reviews;

(g) a notification module for informing said authorized reviewers of the appropriate time for creating said plurality of reviews for said plurality of roles.

12. The apparatus of claim 11, wherein each of said criterion to finalize the role, each of said criterion to finalize the stage, and said criterion to finalize the document is a number to finalize criterion.

13. The apparatus of claim 12, wherein each of said number to finalize criterion is selected from the group consisting of: ONE, ALL, and percentage.

14. The apparatus of claim 11, wherein each of said criterion to finalize the role, each of said criterion to finalize the stage, and said criterion to finalize the document is a condition to finalize criterion.

15. The apparatus of claim 11, further comprising:

(a) said workflow graph structure further comprising a role transfer on finalize action for each of said plurality of roles, and a stage transfer on finalize action for each of said plurality of stages;

(b) a role transfer submodule in said workflow manager for transferring information from said plurality of reviews for one of said plurality of roles to said at least one document, according to corresponding said role transfer on finalize action upon satisfying said criterion to finalize the role for said one of said plurality of roles;

(c) a stage transfer submodule in said workflow manager for transferring information from said plurality of reviews for one of said plurality of roles incoming in one of said plurality of stages to said at least one document, according to corresponding said stage transfer on finalize action upon satisfying said criterion to finalize the stage for said one of said plurality of stages.

16. The apparatus of claim 11, further comprising:
(a) a grading interface submodule in said reviewer interface module for ranking said plurality of aspects, using a grade and a weight;
(b) said work flow graph structure further comprising:
  (i) for each of said plurality of roles, a role grade formula to be applied to said grade and said weight of said plurality of reviews associated to said each of said plurality of roles;
  (ii) for each of said plurality of stages, a stage grade formula to be applied to said grade and said weight of said plurality of roles incoming into said each of said plurality of stages;
  (iii) for said generic document, a document grade formula to be applied to said grade and said weight of said plurality of stages.

17. The apparatus of claim 16, wherein each of said role grade formula, each of said stage grade formula, and each of said document grade formula is selected from the group consisting of: MAX, MIN, SUM, AVG, CNT, WSUM, WAVG, EARLIEST, and LATEST.

18. The apparatus of claim 11, further comprising:
(a) said workflow graph structure further comprising a plurality of stop conditions,
  (i) for said genetic review, a review stop condition to be evaluated upon processing of said at least one document;
  (ii) for each of said plurality of roles, a role stop condition to be evaluated upon processing of said each of said plurality of roles;
  (iii) for each of said plurality of stages, a stage stop condition to be evaluated upon processing of said each of said plurality of stages;
  (iv) for said generic document, a document stop condition to be evaluated upon processing of said at least one document;
(b) a stop submodule in said workflow manager for stopping said participatory evaluation upon satisfying any of said plurality of stop conditions.

19. The apparatus of claim 18, further comprising:
(a) said workflow graph structure further comprising a review transfer on stop action for said generic review, a role transfer on stop action for each of said plurality of roles, and a stage transfer on stop action for each of said plurality of stages;
(b) a review transfer submodule in said workflow manager for transferring information from each of said plurality of reviews to said at least one document, according to said review transfer on stop action upon satisfying said review stop condition for said each of said plurality of reviews;
(c) a role transfer submodule in said work flow manager for transferring information from said plurality of reviews for one of said plurality of roles to said at least one document, according to corresponding said role transfer on stop action upon satisfying said role stop condition for said one of said plurality of roles;
(d) a stage transfer submodule in said workflow manager for transferring information from said plurality of reviews for one of said plurality of roles incoming into one of said plurality of stages to said at least one document, according to corresponding said role transfer on stop action upon satisfying said stage stop condition for said one of said plurality of stages.

20. The apparatus of claim 11, further comprising:
(a) a specification module for specifying at least one notification template; (b) said workflow graph structure further comprising a role template formula for each of said plurality of roles, and a document template formula for said generic document.

* * * * *